US005745767A

United States Patent [19]

Rosen et al.

[11] Patent Number: 5,745,767
[45] Date of Patent: Apr. 28, 1998

[54] METHOD AND SYSTEM FOR TESTING THE INTEROPERABILITY OF APPLICATION PROGRAMS

[75] Inventors: Douglas Jay Rosen, Kirkland; Ross Faulkner Smith, Jr., Redmond, both of Wash.

[73] Assignee: Microsoft Corporation, Redmond, Wash.

[21] Appl. No.: 411,534

[22] Filed: Mar. 28, 1995

[51] Int. Cl.$^6$ .................................................. G06F 9/45
[52] U.S. Cl. ........................................................ 395/704
[58] Field of Search ........................ 395/700, 703, 395/704, 701, 650, 500, 183.01, 183.13, 183.14, 183.22

[56] References Cited

U.S. PATENT DOCUMENTS

| | | | |
|---|---|---|---|
| 5,157,779 | 10/1992 | Washburn et al. | 395/575 |
| 5,233,611 | 8/1993 | Triantafyllos et al. | 395/183.22 |
| 5,404,528 | 4/1995 | Mahajan | 395/650 |
| 5,410,681 | 4/1995 | Jessen et al. | 395/500 |
| 5,418,941 | 5/1995 | Peters | 395/575 |
| 5,475,843 | 12/1995 | Halviatti et al. | 395/700 |
| 5,495,578 | 2/1996 | Rohrbaugh et al. | 395/185.04 |

*Primary Examiner*—Emanuel T. Voeltz
*Assistant Examiner*—Peter J. Corcoran, III
*Attorney, Agent, or Firm*—Seed and Berry LLP

[57] ABSTRACT

A method and system for testing the interoperability of application programs. The interoperability testing system uses an application-independent test script and application-specific command scripts to test the interoperability of application programs. An application-independent test script contains a series of high-level application-independent commands that are to be performed to test the application programs. Each application program to be tested has a corresponding application-specific command script. An application-specific command script contains an implementation of each high-level command for the corresponding application program. To test application programs, the interoperability testing system executes an application-independent test script by reading each high-level command from the test script, retrieving the implementation of that high-level command for the application program that is to perform that command, and executing that implementation.

42 Claims, 18 Drawing Sheets

[CNT_PROP]
nprops=6  ~~ 306

302 {
prop0=C_DragDrop ~~ 310
prop1=C_OLE20
prop2=C_InPlace
prop3=C_Bit32
prop4=C_MDI
prop5=C_Storage

[SVR_PROP]
nProps=11 ~~ 308

304 {
prop0=S_SrvrCntr
prop1=S_DragDrop ~~ 312
prop2=S_InPlace
prop3=S_Bit32
prop4=S_OLE20
prop5=S_MDI
prop6=S_Storage
prop7=S_DLL
prop8=S_Mini
prop9=S_Modal
prop10=S_CopyObject

*FIG. 3*

[TOTAL] ~ 402
nCntr=5
nSrvr=3

[LIST] ~ 404
cntr1=CNT_EXCELSHEET16
cntr2=CNT_WORDDOC16
cntr3=CNT_PROJECT16
cntr4=CNT_PPTSLIDE16
cntr5=CNT_CARDFILE32 srvr1=SVR_WORDDOC16
srvr2=SVR_EXCELSHEET16
srvr3=SVR_PPTSLIDE16

401A {
[CNT_EXCELSHEET16] ~ 401A1
Desc=Microsoft Excel Worksheet, 16-bit, USA ~ 401A2
AppName=c:\apps\excel\excel ~ 401A3
Caption=Microsoft Excel ~ 401A4
Ext=.xls ~ 401A5
Props=000000170000000000000000000000000
}
401G 401B {
[CNT_WORDDOC16] 401A6
Desc=Microsoft Word 6.0 Document, 16-bit, USA
AppName=c:\apps\winword\winword
Caption=Microsoft Word
Ext=.doc
Props=00000017000000000000000000000000
}

401C {
[CNT_PPTSLIDE16]
Desc=Microsoft PowerPoint Slide 4.0, 16-bit, USA
AppName=c:\apps\powerpnt\powerpnt
Caption=Microsoft PowerPoint
Ext=.ppt
Props=00000017000000000000000000000000
}
401H 401D {
[CNT_PROJECT16]
Desc=Microsoft Project, 16-bit, USA
AppName=c:\msoffice\winproj\winproj
Caption=Microsoft Project
Ext=.mmp
Props=00000017000000000000000000000000
}

401E {
[CNT_CARDFILE32] ~ 406
Desc=Cardfile Windows Applet ~ 408
AppName=Cardfile ~ 410
Caption=Cardfile ~ 412
Ext=.crd ~ 414
DataFile0=Card32_1 ~ 416
DataFile1=Card32_2
DataFile2=Card32_3
DataFile3=Card32_4
Props=00000008000000000000000000000000 ~ 418
}

401F {
[SVR_WORDDOC16] ~ 420
Desc=Microsoft Word 6.0 Document Server, 16-bit, USA
AppName=c:\apps\winword\winword
Caption=Microsoft Word
Ext=.doc
ObjClass=Microsoft Word 6.0 Document
ActVerb=Open ~ 424
DataFile0=word16_1 ~ 428    422
DataFile1=word16_2
DataFile2=word16_3
DataFile3=word16_4
CntrID=CNT_WORDDOC16 ~ 426
Props=00000c36000000000000000000000000
}

[SVR_EXCELSHEET16]
Desc=Microsoft Excel Worksheet Server, 16-bit, USA
AppName=c:\msoffice\excel\excel
Caption=Microsoft Excel
Ext=.xls
ObjClass=Microsoft Excel 5.0 Worksheet
ActVerb=Edit
DataFile0=xls16_1                          430
DataFile1=xls16_2
DataFile2=xls16_3
DataFile3=xls16_4
CntrID=CNT_EXCELSHEET16
Props=00000437000000000000000000000000

[SVR_PPTSLIDE16]
Desc=Microsoft PowerPoint 4.0 Slide Server, 16-bit, USA
AppName=c:\msoffice\powerpnt\powerpnt
Caption=Microsoft PowerPoint
Ext=.ppt
ObjClass=MS PowerPoint 4.0 Slide
ActVerb=Edit
DataFile0=pptsld_1
DataFile1=pptsld_2
DataFile2=pptsld_3
DataFile3=pptsld_4
CntrID=CNT_PPTSLIDE16
Props=00000000000000000000000000000000

*FIG. 4*

502 {
[ZEPPELIN]
zep_root=C:\ZEPPELIN\TESTROOT  ~ 504
data_dir=c:\zeppelin\testroot\data  ~ 506
net_dir=<unc name | net connection>  ~ 508

510 {
[Total]
nTest=4

512 {
[List]
test0=OT01000.mst
test1=OT01001.mst
test2=OT01002.mst
test3=OT01003.mst 513A {
[OT01000.mst]  ~ 514
nCntr=1  ~ 516
nSrvr=1  ~ 518
Desc=Insert Object  ~ 520
cP=0000000a0000000000000000000000 ~ 522
cM=ffffffffffffffffffffffffffffffff ~ 524

513B {
[OT01001.mst]  ~ 528
nCntr=1
nSrvr=1
Desc=Insert Object and Activate

513C {
[OT01002.mst]
nCntr=1
nSrvr=1
Desc=Insert Object, Activate, Change, Close Server 513D {
[OT01003.mst]
nCntr=1
nSrvr=1
Desc=Insert Object, Save

*FIG. 5*

[OT01001.MST]
combo0=CNT_EXCELSHEET16*SVR_WORDDOC16
combo1=CNT_EXCELSHEET16*SVR_EXCELSHEET16
combo2=CNT_EXCELSHEET16*SVR_PPTSLIDE16
combo3=CNT_WORDDOC16*SVR_WORDDOC16
combo4=CNT_WORDDOC16*SVR_EXCELSHEET16
combo5=CNT_WORDDOC16*SVR_PPTSLIDE16
combo6=CNT_PROJECT16*SVR_WORDDOC16
combo7=CNT_PROJECT16*SVR_EXCELSHEET16
combo8=CNT_PROJECT16*SVR_PPTSLIDE16
combo9=CNT_PPTSLIDE16*SVR_WORDDOC16
combo10=CNT_PPTSLIDE16*SVR_EXCELSHEET16
combo11=CNT_PPTSLIDE16*SVR_PPTSLIDE16
combo12=CNT_CARDFILE32*SVR_WORDDOC16
combo13=CNT_CARDFILE32*SVR_EXCELSHEET16
combo14=CNT_CARDFILE32*SVR_PPTSLIDE16

*FIG. 6*

METHOD AND SYSTEM FOR TESTING THE INTEROPERABILITY OF APPLICATION PROGRAMS

TECHNICAL FIELD

This invention relates generally to a computer method and system for testing the interoperability of application programs.

BACKGROUND OF THE INVENTION

The testing of an application program can be time-consuming and expensive. The time and expense of testing increases significantly when testing the interoperability of the application program with other application programs. Although an application program may function properly alone, it may not necessarily function properly when it interoperates with other application programs.

Many application programs are written in an object-oriented environment that supports application program interoperability. One such object-oriented environment is Microsoft OLE 2.01 developed by Microsoft Corporation of Redmond, Wash.

An overview of well-known object-oriented programming techniques is provided. Two common characteristics of object-oriented programming languages are support for data encapsulation and data type inheritance. Data encapsulation refers to the binding of functions and data. Inheritance refers to the ability to declare a data type in terms of other data types. In the C++ language, data encapsulation and inheritance are supported through the use of classes. A class is a user-defined type. A class declaration describes the data members and function members of the class. A function member is also referred to as a method of a class. The data members and function members of a class are bound together in that the function operates on an instance of the class. An instance of a class is also called an object of the class. Thus, a class provides a definition for a group of objects with similar properties and common behavior (i.e., tasks).

To allocate storage for an object of a particular type (class), an object is instantiated. Once instantiated, data can be assigned to the data members of the particular object. Also, once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual means that the function can be overridden by a function of the same name and type in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked. A class which contains at least one pure virtual function member is an abstract class.

An advantage of using object-oriented techniques is that these techniques can be used to facilitate the sharing of objects. For example, an application program implementing the function members of an instantiated object (a "server application program") can share the object with another application program (a "container application program"). To allow an object of an arbitrary class to be shared with a container application program, interfaces are defined through which an object can be accessed without the need for the container application program to have access to the class definitions at compile time. An interface is a named set of logically related function members. In C++, an interface is an abstract class with no data members and whose virtual functions are all pure. Thus, an interface provides a published protocol for two programs to communicate. Interfaces are typically used for derivation: an application program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

In the OLE environment, there are two types of application programs: a container and a server. A container application program receives objects, and a server application program provides objects. For example, a word-processing program may be a container application program. As a container application program, the wordprocessing program may receive an object, such as a spreadsheet object, from a spreadsheet program. In this example, the spreadsheet program is a server application program which is providing the word-processing program with a spreadsheet object. The OLE environment provides facilities for sharing objects with other application programs by either receiving objects or providing objects. Application programs that use the OLE environment can share objects (interoperate) in an application-independent manner. That is, a word-processing program that uses the OLE environment can share objects with another program that uses the OLE environment. In order to ensure that an application program correctly interoperates with another application program, the interoperability is tested.

Conventional testing involves manually writing an application-specific test script (i.e., test program) to test the interoperability of two application programs. The test script is written in a test language, such as the Microsoft Test language developed by Microsoft Corporation. A description of Microsoft Test is provided in the Microsoft Test manual, which is available from Microsoft Corporation and is hereby incorporated by reference. A test script is a sequence of discrete events, such as a mouse move, a mouse click, a key up, or a key down, that represent actions that may be taken by a user of the application programs to be tested. To test the application programs, a testing program reads the events from the test script, and sends a simulation of the events to be tested to the application programs. The application programs receive the simulated events just as if a user had generated the event using a mouse or keyboard. A person testing the application program (i.e., a tester) can see how the application programs process the events and determine whether the application programs are functioning correctly.

In conventional systems, test scripts are written for particular application programs. For example, in order to test whether a server application program A, correctly inserts an object into a container application program B, a test writer would need to know how both A and B function in order to write a test script. In particular, a test writer would write a test script which started A, selected an object from A to insert into B, started B, and then inserted the object into B. It is often very time-consuming to write such a test script. To write such a test script, the test writer needs to be very familiar with each application program and needs to create a typically long sequence of discrete events to be sent to the application programs. Once a test script has been created for A and B, then the interoperability of A and B can be tested. Unfortunately, this test script typically can not be used to test the interoperability of other application programs, but can only be used to test the version of A and B for which it was written. To test whether the server application program A correctly inserts an object into container application program C, a test writer would need to write another test script specific to these two application programs. Then if there is a change to application program A, for example if it is started differently, then each test script for testing application program A would need to be modified accordingly.

It is time consuming to write application-specific test scripts. Moreover, as the number of application programs increase, the combinations of application programs which may be tested increases exponentially. Because test scripts are application-specific and because of the large number of combinations possible, it would take an extensive amount of time for a tester to test all possible application program combinations. Therefore, typically, any interoperability testing is done manually, and only a subset of all possible combinations are tested. Unfortunately, no testing is done on a large number of combinations.

SUMMARY OF THE INVENTION

It is an object of the present invention to provide a method and system for testing the interoperability of application programs.

It is another object of the present invention to provide a method and system of testing an application program.

These and other objects, which will become apparent as the invention is more fully described below, are provided by a method and system for testing the interoperability of application programs. In a preferred embodiment, the computer system includes application programs and high-level commands. Each high-level command specifies an application-independent task. The interoperability testing system selects a plurality of high-level commands. For each application program, an implementation of each selected high-level command is provided. A test script is developed with the high-level commands, where each high-level command specifies the application program that is to perform the task of the high-level command. The interoperability testing system executes the test script. In particular, for each high-level command in the test script, the interoperability testing system retrieves the implementation of the high-level command for the application program that is to perform the task of the high-level command and directs the application program to perform the implementation of the high-level command.

In particular, each application program has low-level commands. Each low-level command indicates a task to be performed by the application program. The computer system includes a test script containing a description of a test to be performed on each application program. The test script has a plurality of application-independent high-level commands. Each high-level command specifies a task to be performed by the application program being tested. For each high-level command of each application program, an implementation of the high-level command for the application program is provided. The implementation has a plurality of low-level commands for directing the application program to perform the task of the high-level command. The interoperability testing system tests the application programs based on the test script. Specifically, the interoperability testing system selects each high-level command in the test script. Then the interoperability testing retrieves the implementation of the selected high-level command for the application program being tested. Next, the interoperability testing system selects each low-level command in the retrieved implementation. For each selected low-level command, the interoperability testing system directs the application program being tested to perform the task of each selected low-level command to effect the performance of the task of the high-level command.

BRIEF DESCRIPTION OF THE DRAWINGS

FIG. 3 illustrates a sample properties table of the database.

FIG. 4 illustrates a sample application configuration information table of the database.

FIG. 5 illustrates a sample test script information table of the database.

FIG. 6 illustrates a sample combinations table of the database.

DETAILED DESCRIPTION OF THE INVENTION

The present invention provides a method and system for testing the interoperability of application programs. In a preferred embodiment, the interoperability testing system uses an application-independent test script and application-specific command scripts to test the interoperability of application programs. An application-independent test script contains a sequence of high-level application-independent commands that are to be performed to test the application programs. For example, high-level application-independent commands include the commands to "start an application" and to "insert an object." Each application program to be tested has a corresponding application-specific command script. The application-specific command script contains an implementation of each high-level command for the corresponding application program. For example, an implementation of the high-level command "insert an object" may consist of a sequence of low-level commands such as (1) select menu "Insert," (2) select menu item "Object," and (3) select a certain object type. These low-level commands may include very low-level commands such as a series of mouse events to control the selecting of a menu.

To test application programs, the interoperability testing system "executes" an application-independent test script. To execute a test script the interoperability testing system reads each high-level command, retrieves the implementation of that high-level command for the application program that is to perform that command, and executes that implementation. Thus, a tester can use an application-independent test script to test the interoperability of different combinations of application programs without needing to know how each high-level command is implemented. To provide this application independence, a preferred embodiment of the interoperability testing system provides an application programming interface (API) function for each high-level command. The commands of a test script are preferably implemented as invocations to the corresponding API function. When an API function is invoked, it locates the implementation of the command for the application program to which the command is directed and executes the implementation. It is preferable that each application developer provides an implementation of each high-level command for the application program. The implementation of each high-level command is referred to as an application-specific callback function. For each application program, there is preferably a one-to-one correspondence between each API function for a high-level command and each application-specific callback function that implements the high-level command.

Figure 1:
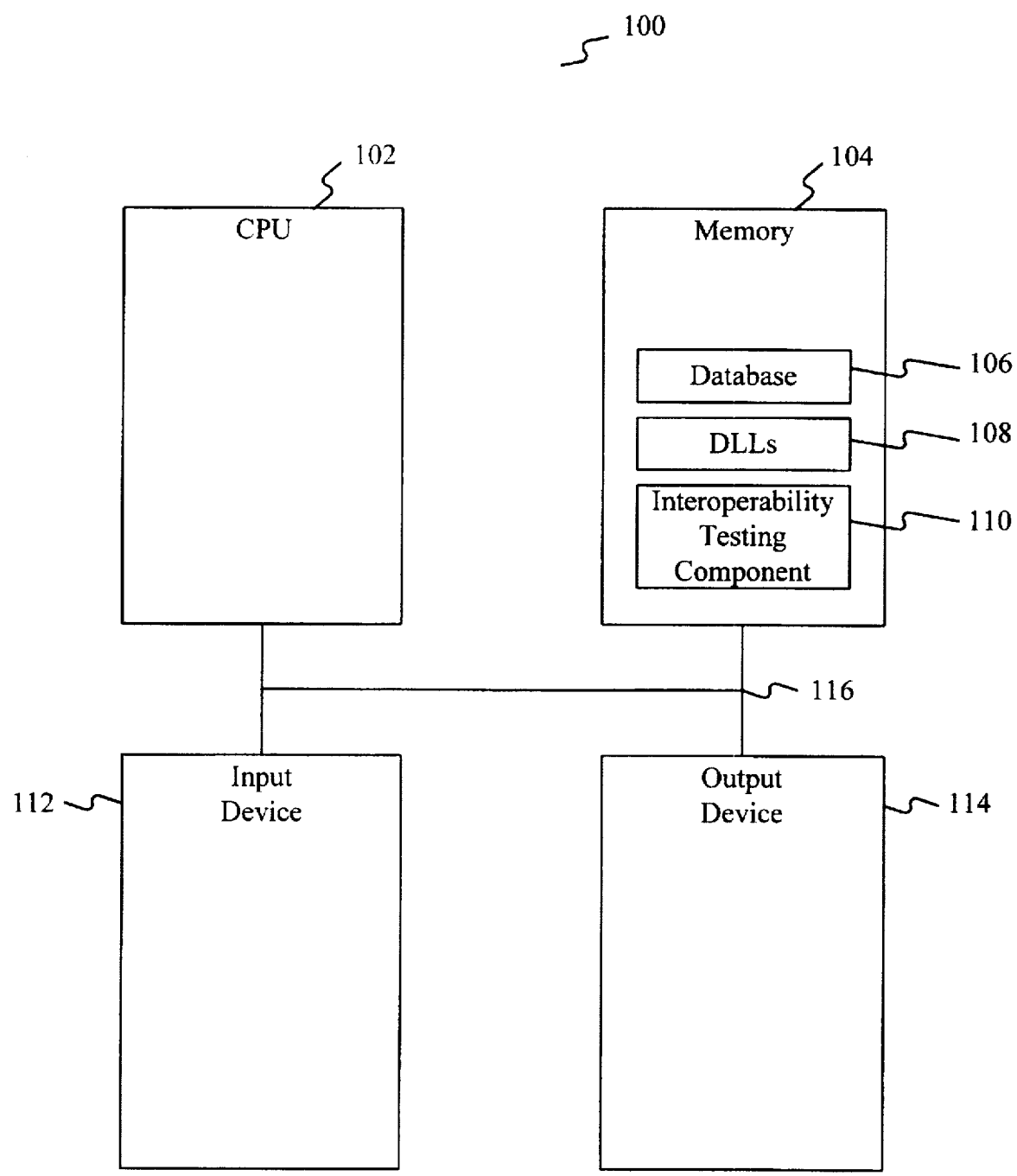
FIG. 1 illustrates an overview block diagram of an apparatus for testing the interoperability of application programs in a preferred embodiment.

FIG. 1 illustrates an overview block diagram of an apparatus for testing the interoperability of application programs in a preferred embodiment. The computer system 100 includes a CPU 102 and a memory 104. The memory includes a database 106 containing interoperability testing information, dynamic link libraries (DLLs) 108, and an interoperability testing component 110. The computer system also includes an input device 112 and an output device 114. A bus 116 connects the components of the computer system. The CPU executes the interoperability testing component at the request of a tester which is received through an input device. The interoperability testing component executes a test script by reading the high-level commands of the test script and invoking API functions located in a DLL. The API functions use the database to locate and retrieve the application-specific callback functions for the application programs. The interoperability testing component invokes these application-specific callback functions to execute the implementation of the high-level commands.

Components Used by the Interoperability Testing System

Figure 2A:
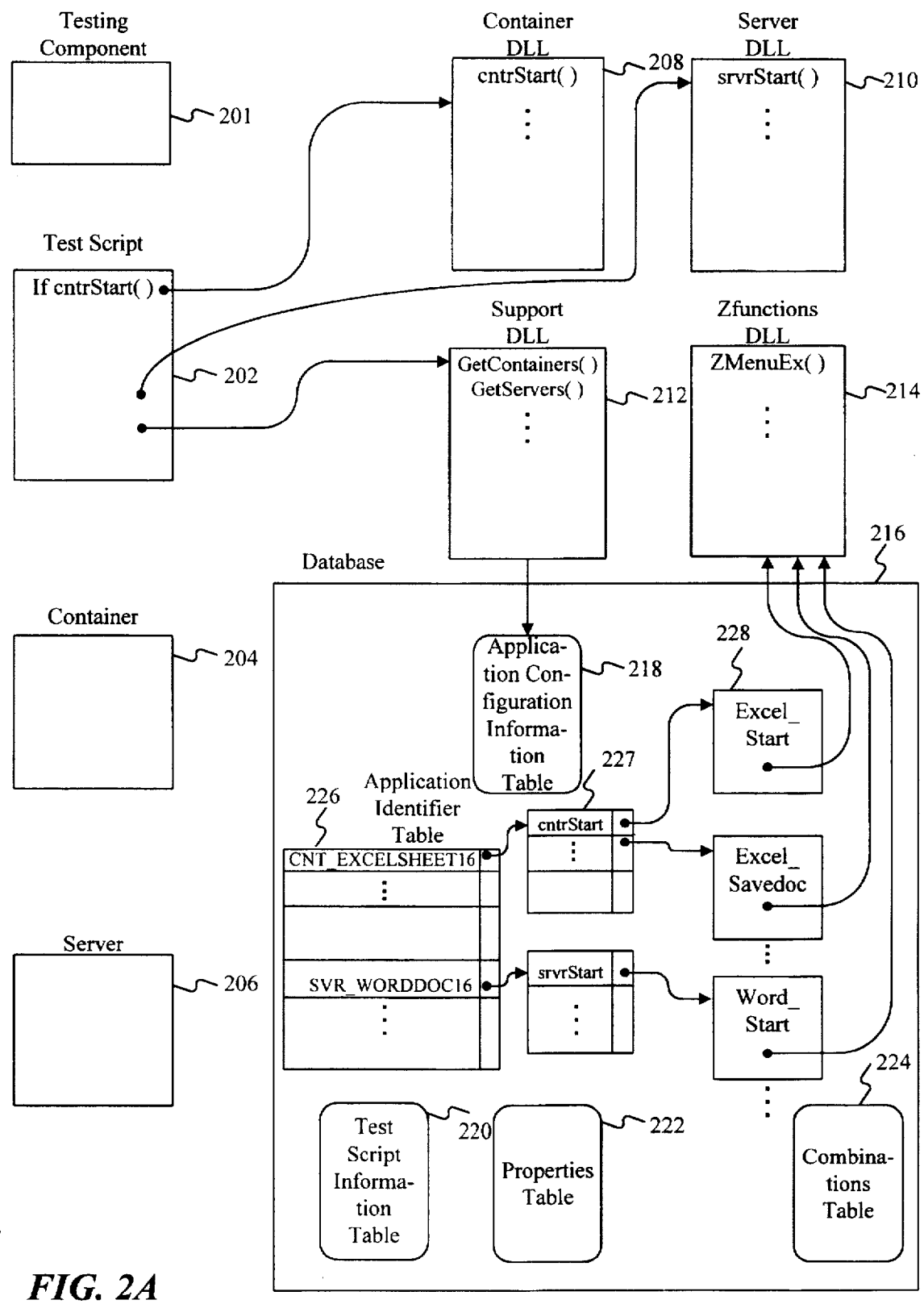
FIG. 2A illustrates the components of the interoperability testing system in a preferred embodiment.

FIG. 2A illustrates the components of the interoperability testing system in a preferred embodiment. The components include a testing component 201, a test script 202, a container application program 204, a server application program 206, a container DLL 208, a server DLL 210, a support DLL 212, a Zfunctions DLL 214, and a database 216. The testing component controls the testing of the container and server application programs based on the test script. The test script contains the test to be performed on the container and server application programs. The test script contains high-level commands and may contain support commands. Each high-level command specifies a task to be performed by the application program being tested. The support commands provide access to the database. The commands are implemented as invocations to functions in the DLLs. The container and server DLLs contain the API functions, and the support DLL contains support functions that implement the support commands. The API functions of the container and server DLLs retrieve from the database corresponding implementations of the high-level commands for the application program to which the commands are directed and execute the implementations. The implementations include low-level commands which direct an application program to perform the task of the high-level command. Each low-level command indicates a task to be performed by the application program. Support functions of the support DLL implement access to the database.

The database includes an application configuration information table 218, a test script information table 220, a properties table 222, a combinations table 224, an application identifier table 226, callback function tables 227 (i.e., high-level command tables), and application-specific callback functions 228. The database contains information describing various attributes of the application programs. Further, each application program can have multiple sets of information (i.e., configurations) to describe various combinations of attributes that may apply when the application program is tested. For example, each application program may have a set of information to describe its attributes when it is executed as a server and another set of information to describe its attributes when it is executed as a container. Each different set of information is indexed in the database by a unique application identifier and describes a particular configuration of the application program. The application configuration information table 218 contains information for each configuration of an application program, more specifically each application identifier, such as the location of the application program and properties of the configuration of the application program. The test script information table 220 includes an entry for each test script that contains parameters for the execution of the test script. The properties table 222 contains a list of the system defined and tester defined properties for the server and container application programs. The combinations table 224 contains a list of the various combinations of servers and containers for which the test script will be executed. The application identifier table 226 includes an entry for each application identifier. Each entry contains a pointer to a callback function table 227. Each callback function table contains an entry for each high-level command and a pointer to an application-specific callback function 228 that implements the high-level command.

When executing the test script, the interoperability testing system calls API functions from the container DLL and the server DLL. Each API function uses the application identifier table 226 to access the callback function table for the configuration of the application program to which the high-level command is directed. The API function uses the callback function table to locate the application-specific callback function that implements the high-level command. The interoperability testing system then invokes the application-specific callback function.

Figure 2B:
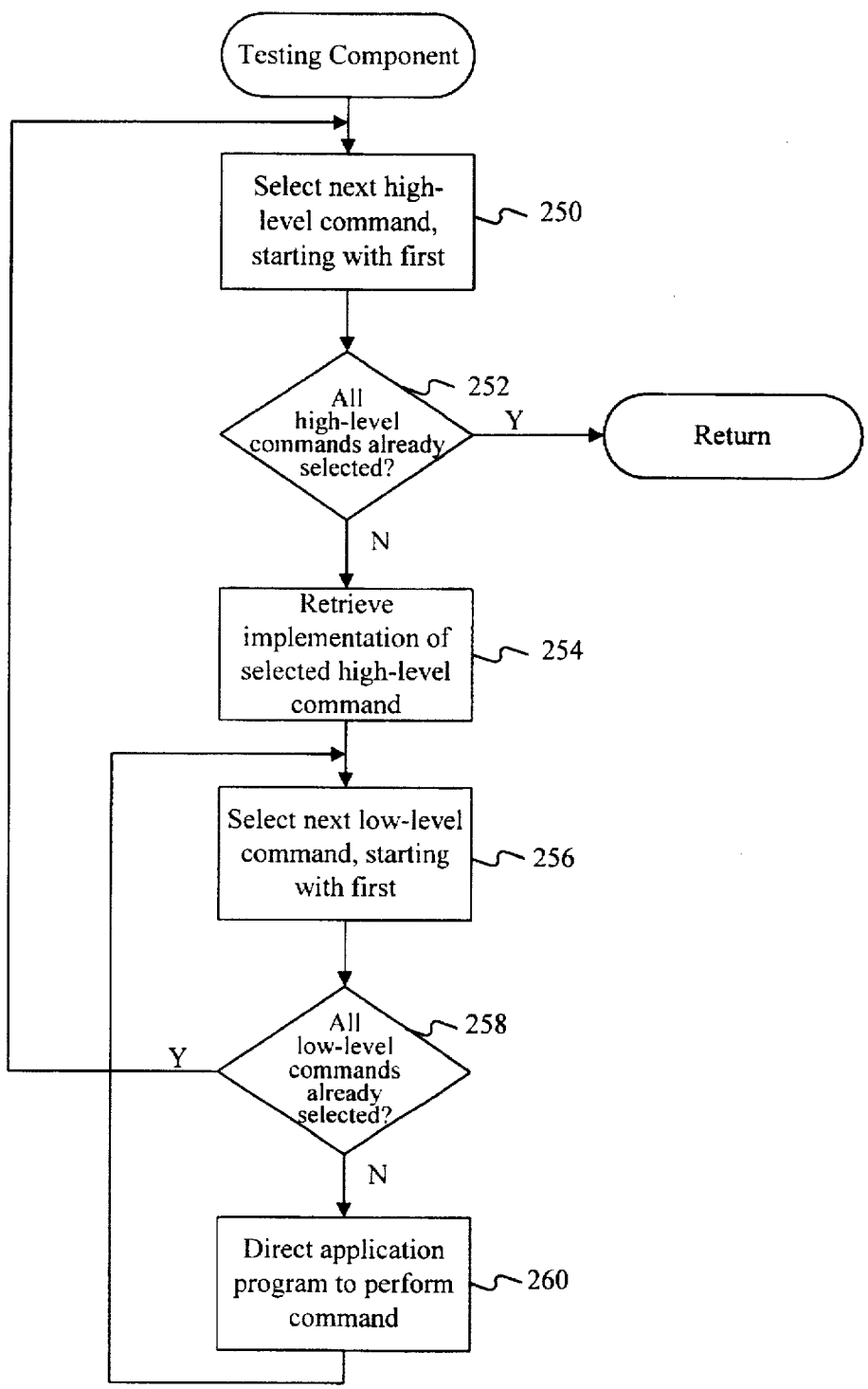
FIG. 2B an overview flow diagram of the testing component.

FIG. 2B is an overview flow diagram of the testing component. The testing component selects the high-level commands of the test script, retrieves the implementation of the selected high-level command, selects each low-level command of the retrieved implementation, and directs the application program being tested to perform the tasks of the selected low-level command. In step 250, the testing component selects the next high-level command in the test script, starting with the first high-level command. In step 252, if all the high-level commands have already been selected, then the testing is complete, else the testing component continues at step 254. In step 254, the testing component retrieves the implementation of the selected high-level command. In step 256, the testing component selects the next low-level command of the retrieved implementation, starting with the first low-level command. In step 258, if all the low-level commands have already been selected, then the testing component loops to step 250 to select the next high-level command, else the testing component continues at step 260. In step 260, the testing component directs the application program being tested to perform the tasks of the low-level command and loops to step 256 to select the next low-level command.

Properties Table

FIG. 3 illustrates a sample properties table 222 of the database. The properties table 222 contains a list of all properties that an application program may possess. The interoperability testing system provides a set of system defined properties, but additional properties may be added by a tester. The application configuration information table 218 contains a list of which of these properties each application identifier possesses. When a tester executes a test script, the tester may specify which properties the application programs to be tested should possess. For example, if the tester wants to test how 16-bit servers interoperate with 32-bit containers, the tester would specify that each server should have the property of 16-bits and each container should have the property of 32 bits. The interoperability testing system would then select servers and containers for which the test script should be executed. The interoperability testing system stores the properties that are specified for an execution of a test script in the test script information table 220 for later retrieval when determining the servers and containers.

The properties table contains a CNT_PROP section 302 for container properties and a SVR_PROP section 304 for server properties. Each section includes a count that indicates the number of properties defined, that is, container properties count 306 and server properties count 308. Each section contains the identifiers of the container properties 310 and server properties 312. As shown, the identifiers for the container properties are: C_DragDrop, which indicates that Drag/Drop is supported; C_OLE20, which indicates an OLE 2.0 container application program; C_InPlace, which indicates that In-place insertion/activation is supported; C_Bit32, which indicates a 32-bit application program; C_MDI, which indicates an MDI container application program; and C_Storage, which indicates that DocFile format is supported. The identifiers for the server properties are: S_SrvrCntr, which indicates that the server identifiers function may also act as a container; S_DragDrop, which indicates that Drag/Drop is supported; S_InPlace, which indicates that In-place insertion activation is supported; S_Bit32, which indicates a 32-bit application program; S_OLE20, which indicates that it is an OLE 2.0 server application program; S_MDI, which indicates an MDI application program; S_Storage, which indicates that DocFile format is supported; S_DLL, which indicates that the server exists only as a DLL; S_Mini, which indicates the server is a mini-server, S_Modal, which indicates that a modal application program; and S_CopyObject, which indicates that the server puts the object format on the clipboard after a copy.

Application Configuration Information Table

FIG. 4 illustrates a sample application configuration information table 218 of the database. The application configuration information table includes a configuration section 401A–H for each configuration of an application program which describes the attributes of the configuration of the application program. Each configuration section contains the application identifier for the configuration 401A1, a description of the application program 401A2, the location of the application program 401A3, the caption which the application program's window contains 401A4, the file extension of the application program 401A5, and properties which the application program possesses 401A6. The application configuration information table may be accessed by both test scripts and by application-specific callback functions. Both test scripts and application-specific callback functions may access this information using support functions from the support DLL. A tester maintains the application configuration information table by using a dialog box provided by the interoperability testing system.

The application configuration information table includes a TOTAL section 402 indicating the number of configurations of container application programs and server application programs whose application configuration information is in the table. The application configuration information table also includes a LIST section 404 which provides the application identifiers of the configurations of container application programs and server application programs.

Each configuration section begins with the application identifier. Each configuration section may also contain a Desc entry, an AppName entry, a Caption entry, an Ext entry, a Datafilex entry, and a Props entry. For example, CNT_CARDFILE32 406 is an application identifier which indicates the beginning of an configuration section for this application identifier. The Desc entry 408 provides a description of the application program, such as "Cardfile Windows Applet." The AppName entry 410 provides the location of the application program, such as "Cardfile." The Caption entry 412 provides the caption, such as "Cardfile." The Ext entry 414 provides the file extension for the application program, such as ".crd." A file extension provides additional information about a file, such as indicating the type of the file. The DataFile0 entry 416 provides the name of a datafile which is used to store data if the test script needs to store data into a file, such as Card32_1. The interoperability testing system allows up to four DataFilex entries, where x ranges between zero and three. The Props entry 418 identifies the properties that the application identifier possesses. The Props entry includes a series of bits representing the properties from the properties table 222. When a bit is one (i.e., on), then the configuration of an application program possesses that property.

Additionally, an configuration section for a server application program may include the following entries: ObjClass, ActVerb, and CntrID. One example of a section for a server application program is the SVR_WORDDOC16 section 401F. The ObjClass entry 422 provides the name of the object class for an object that the server application program provides. The object classes are defined by application programs. For example, one object class is "Microsoft Word 6.0 Document." The ActVerb entry 424 contains the type of action by which this configuration of the server application program should be activated, such as "Open." An application-specific callback function for activating the application program accesses the ActVerb entry to determine how to activate an object serviced by this configuration of the application program. The CntrID entry 426 provides the application identifier of the server application program when it is acting as a container application program. For example, the SVR_WORDDOC16 application identifier represents a server application program and the CNT_WORDDOC16 application identifier represents a container application program. One CntrID entry is allowed for each configuration of a server application program. Furthermore, the configuration section for a server application program may include a DataFilex entry 428. The DataFilex entry specifies a file containing a server object that a test script may insert into a container application program.

Test Script Information Table

FIG. 5 illustrates a sample test script information table 220 of the database. The test script information table contains a section for each test script that contains parameters for the test script. Each section includes a description of what the test script does, the number of container and server application programs the test script uses, and the properties that the servers and containers should possess.

The first section of the test script information table is the ZEPPELIN section 502. The ZEPPELIN section includes a zep_root entry 504 that identifies the location of the other database tables, the data_dir entry 506 that identifies the location of data files which a test script may access, and the net_dir entry 508 that identifies the location of files on a network which a test script may want to access. The DataFilex entry identifies data files, and these data files are found in the location identified by a data_dir entry. The information in the ZEPPELIN section is typically initialized by a tester who installs the interoperability testing system on a computer system. The TOTAL section 510 indicates the total number of test scripts for which test script information has been entered into the database. The LIST section 512 provides the name of each test script.

The test script information table includes a test script section 513A–D for each test script. The test script sections provide parameters for the test script. The test script writer loads the information for a test script section into the table. Each test script section includes a section title 514, a nCntr entry 516, a nSrvr entry 518, and a Desc entry 520. Also, some test script sections include cP and cM or sP and sM entries 522 and 524. For example, in the test script section 513A, the OT01000.mst section 514 identifies a particular test script, the nCntr entry 516 identifies the number of configurations of the container application programs used by the test script, the nSrvr entry 518 identifies the number of configurations of the server application programs used by the test script, the Desc entry 520 identifies what the test does, such as "Insert Object," and the cP entry 522 and a cM entry 524 identify properties.

A tester may select configurations of container application programs or server application programs for testing by specifying application identifiers which possess certain properties. A tester may specify the particular properties for the container and server application programs using a dialog box provided by the interoperability testing system. In the test script information table, a cP entry specifies the properties that the configuration of the container application program should possess, and a cM entry is a mask that identifies which properties that the tester wants to ensure that the selected configuration of a container application program possesses. Similarly, sP and sM entries are used to specify which configurations of server application programs should be selected. The cP, cM, sP, and Sm entries are bitmasks that contain one bit for each property.

For example, if the cM entry does not contain a corresponding entry to a certain property, then when the interoperability testing system selects the container application programs for testing with the test script, the interoperability testing system ensures that each container application program selected does or does not possess that property depending on the setting of the bit for that property in the cP entry.

Initially, a cP entry contains all zeros and the cM entry contains all ones. If a tester specifies that the container application program possesses a certain property, then the interoperability testing system sets a bit corresponding to the property in the cP entry to one and leaves the other bits in the cP entry as zero. When the tester specifies that the container application program should not possess a certain property, then the interoperability testing system sets a bit corresponding to that property to zero in the cP entry. In either event, the interoperability testing system sets a corresponding bit in the cM entry to zero. The following are sample cP and cM entries.

```
cP 1010
cM 0011
```

In this sample, each container application program that is selected will possess the first property and will not possess the second property. The container application programs may or may not possess the third and fourth properties.

The test script information table may also contain local properties, requests for specific application identifiers, and bad combination entries which limit the container application programs or server application programs that are tested. Local properties are used to specify particular application identifiers for container application programs and server application programs. For example, if a tester wants to test two server application programs and the first server application program should be a 32-bit server application program and the second server application program should be a 16-bit server application program, the tester specifies local properties for each of the two server application programs. This is done by specifying that the first server application program is to have the S_Bit32 property using the entry Srvr1=S_Bit32 and specifying the second server application program is not to have it using the entry Srvr2=!S_Bit32. The exclamation mark denotes a logical not. Since a server application program is either a 32-bit server application program or a 16-bit server application program, the entry !S_Bit32 indicates that the second server application program should be a 16-bit server application program.

A tester may also want to test a particular configuration of a container or server application program. The tester may specify the application identifiers of the configuration in the test script information table. For example, if a tester only wants to test the Svr_ExcelSheet16 configuration of the server application program, then the tester enters into the database: Srvr1=Svr_ExcelSheet16.

A tester may specify that certain container-server combinations not be selected. To specify such a combination, a tester adds an entry into the test script section with the following format:

*bcX=CNT_ID\*SVR_ID* where X is a number greater than or equal to zero, where CNT_ID is the application identifier of a container application program, and where SVR_ID is the application identifier of a server application program.

Combinations Table

FIG. 6 illustrates a sample combinations table 224 of the database. The combinations table provides all combinations of the application identifiers for the container application programs and server application programs that are selected based on the information in the test script section of the test script information table. The interoperability testing system provides a driver program which executes each test script identified in the test script information table with each combination for that test script in the combinations table. In addition, the interoperability testing system allows a tester to execute a single test script. The combinations table is generated when a test script is executed by the interoperability testing system and the GetContainers or the GetServers API function is invoked.

The combinations table includes a section title, such as "OT01001.MST" 602 that identifies the test script and lists the combinations of application identifiers for the container and server application programs that have been selected. Each entry in the combinations table contains a run count 604 (i.e., a combination number) and a container-server combination 606. An example of a container-server combination is CNT_WORDDOC16*SVR_EXCELSHEET16 which has a run count of 4. The CNT_WORDDOC16 application identifier is the container application program and the SVR_EXCELSHEET16 application identifier is the server application program.

Application Identifier Table

Figure 7:
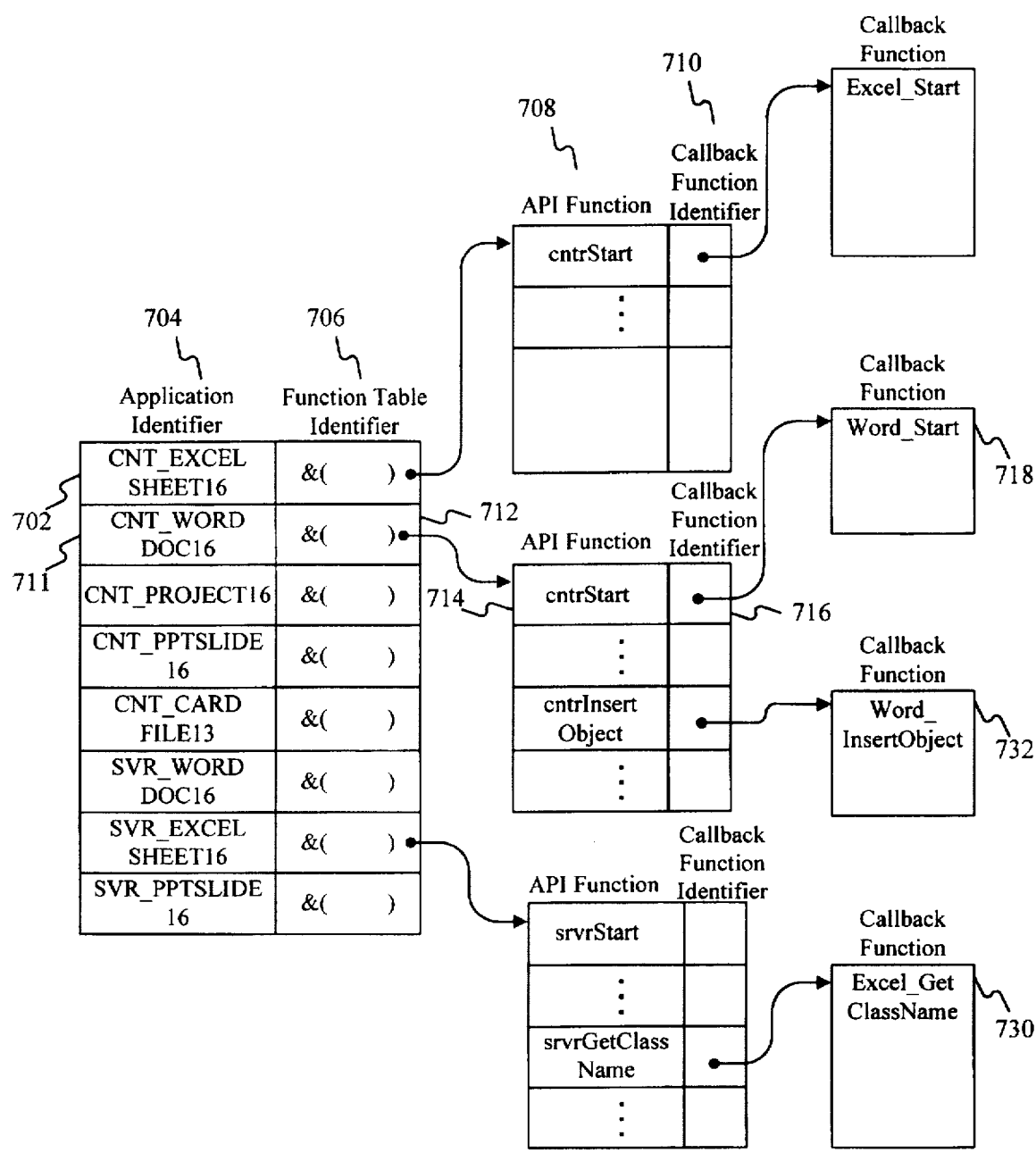
FIG. 7 illustrates sample data structures that map an application identifier to the corresponding callback functions.

FIG. 7 illustrates sample data structures that map an application identifier to the corresponding application-specific callback functions. The application identifier table is used by the API functions to locate the callback functions.

The application identifier table 702 has an entry for each configuration of an application program. Each entry contains an application identifier 704 and a pointer 706 to a callback function table. Each callback function table contains an entry for each high-level command 708 and a pointer 710 to a corresponding application-specific callback function. Different configurations of application programs may share (i.e., point to) the same application-specific callback function.

API Functions

The interoperability testing system provides API functions. These API functions may call Windows API functions described in the Software Development Kit for Microsoft Windows 3.1, which is available from Microsoft Corporation and is hereby incorporated by reference.

One example of an API function is the cntrStart function which is called to execute the high-level command "start a container." The test script calls the cntrStart function with the application identifier of the configuration of a container application program to start. Based on the application identifier, the cntrStart function accesses the application identifier table to obtain a pointer to the corresponding callback function table. Then, based on the API function (i.e., cntrStart), the cntrStart function accesses the callback function table and obtains a pointer to the corresponding callback function. The cntrStart function then invokes the callback function, which implements the start a container command.

The following table contains a description of the API functions.

TABLE 1

| cntrStart | |
|---|---|
| Description | |
| This API function starts an instance of the application associated with the passed dwCntrID. Once the application is started, the lphWnd parameter is filled with the window handle (HWND) of the newly started instance. | |
| Parameters | Meaning |
| dwCntrID | Application identifier for the container application program to be started. |
| lphWnd | The window handle, filled by this function, of the container application program after it's started |
| dwReserved | Reserved |
| Returns | |
| If the function is successful, the return value is OLETEST_SUCCESS, otherwise it is OLETEST_FAILED. | |

| cntrSaveDoc | |
|---|---|
| Description | |
| This API function saves the current document with the filename specified by the passed szDestFile. The szDestFile parameter should not contain a file extension. This function retrieves the file extension from the database (see GetIDEntry()) and appends it to szDestFile. However, this function checks whether an extension was provided as a part of szDestFile and, if so, uses it. | |
| Parameters | Meaning |
| dwCntrID | Application identifier for the current container application program |
| hWnd | Handle to the container application program's main window. |
| szDestFile | String describing destination file for the save |
| fReplace | TRUE to overwrite existing file, FALSE if not |
| dwReserved | Reserved |
| Returns | |
| If the function is successful, the return value is OLETEST_SUCCESS, otherwise it is OLETEST_FAILED. | |

TABLE 1-continued cntrOpenDoc
Description
This API function opens a new document in a container application program with the passed szFileName. If the szFileName parameter is an empty string, this function performs the equivalent of a File/New operation. The file that is opened may contain links to other applications. If so, a dialog or message box may appear which asks whether the links are to be updated. If fUpdate is TRUE, then the links are updated, otherwise they are not.

| Parameters | Meaning |
| --- | --- |
| dwCntrID | Application identifier for the current container application program |
| hWnd | Window handle to close |
| szFileName | Name of the document to open |
| fUpdate | Flag specifying how to deal with the Update Links dialog |
| dwReserved | Reserved |

Returns
If the function is successful, the return value is OLETEST_SUCCESS otherwise it is OLETEST_FAILED.

cntrCloseDoc
Description
This API function closes the active document in the container application program with the passed dwCntrIId.

| Parameters | Meaning |
| --- | --- |
| dwCntrID | Application identifier for the current container application program |
| hWnd | Window handle to close |
| dwReserved | Reserved |

Returns
If the function is successful, the return value is OLETEST_SUCCESS, otherwise it is OLETEST_FAILED.

cntrClose
Description
This API function closes the container application program with the passed dwCntrID. If the value of hWnd is NULL, then this function closes the first instance of the application associated with dwCntrID. If hWnd is not NULL, this function ensures that the window handle belongs to an application associated with dwCntrID.

| Parameters | Meaning |
| --- | --- |
| dwCntrID | Application identifier for the current container application program |
| hWnd | Window handle to close |
| dwReserved | Reserved |

Returns
If the function is successful, the return value is OLETEST_SUCCESS, otherwise it is OLETEST_FAILED.

cntrInsertObject
Description
This API function inserts a server object with the passed szClassName into the container application program, either as an icon or a visible object. The test script calls the srvGetClassName() function to obtain the classname of the object to be inserted.

| Parameters | Meaning |
| --- | --- |
| dwCntrID | Application identifier for the current container application program |
| hWnd | The container application program's main window handle |
| szClassName | The class of the server object to Insert (i.e.: appears in Insert Object box) |
| fIcon | TRUE to Insert as Icon, FALSE if not |
| dwReserved | Reserved |

Returns
If the function is successful, the return value is OLETEST_SUCCESS, otherwise it is OLETEST_FAILED.

cntrInsertObjectFromFile
Description
This API function either performs an Insert embedding from the passed szSrcFile or an Insert link to the passed szSrcfFile. The test script calls the srvrGetClassName() function to obtain the classname of the object to be inserted. The test script calls the srvrGetDataFile() function in order to obtain the name of the file to insert.

| Parameters | Meaning |
| --- | --- |
| dwCntrID | Application identifier for the current container application program |
| hWnd | The container application program's main window handle |

TABLE 1-continued

| | |
|---|---|
| szSrcFile | Specifies the file to Insert From |
| fLink | TRUE for insert link to file, FALSE for create embedded from file |
| fIcon | TRUE for Insert as Icon, FALSE if not |
| dwReserved | Reserved |

Returns
If the function is successful, the return value is OLETEST_SUCCESS, otherwise it is OLETEST_FAILED.

cntrChangeLink
Description
This API function performs actions upon a linked object based on the passed nType. If this function is called without specifying CL_CHANGE in the nType parameter, then the szNewFile parameter is ignored. Also, certain combinations under nType are not valid and may produce unexpected results. Therefore, the values of the nType parameter should be dealt with by the callback function to avoid failure.

| Parameters | Meaning |
|---|---|
| dwCntrID | Application identifier for the current container application program |
| hWnd | The container application program's main window handle |
| szNewFile | The name of the file to which to change the link |
| nType | Describes which actions to perform upon the link. It can be a combination of any of the following values:<br>. CL_MANUAL<br>. CL_AUTO<br>. CL_CHANGE<br>. CL_BREAK<br>. CL_OPEN |
| dwReserved | Reserved | cntrPasteObject
Description
This API function either performs a Paste object or a Paste Link based on the passed fLink. Also, support functions have been provided to enable container application programs to keep track of the objects which have been inserted into them (see GetNumAppObjects() and AddAppObject()).

| Parameters | Meaning |
|---|---|
| dwCntrID | Application identifier for the current container application program |
| hWnd | The container application program's main window handle |
| fLink | TRUE for Paste Link, FALSE for Paste |
| dwReserved | Reserved |

Returns
If the function is successful, the return value is OLETEST_SUCCESS, otherwise it is OLETEST_FAILED.

cntrPasteSpecial
Description
This API Function pastes an object via the Paste/Special dialog. If szFormat is an empty string, then the default format should be selected (i.e., whatever is currently selected in the dialog box). Also, support functions have been provided to enable container application programs to keep track of objects which have been inserted into them (see GetNumAppObjects() and AddAppObject()).

| Parameters | Meaning |
|---|---|
| dwCntrID | Application identifier for the current container application program |
| hWnd | The container application program's main window handle |
| szFormat | Format of the data to be pasted |
| fLink | TRUE to do a Paste/Link, FALSE if not |
| fIcon | TRUE to paste object as an icon, FALSE if not |
| dwReserved | Reserved | cntrGetDropSpace
Description
This API function retrieves the drop space from the passed dwCntrID. This function fills the lpRect parameter. The test script obtains the dimensions of the client area by calling the GetClientRect() Windows API. For MDI applications, the drop space is the client area of the currently selected document window.

| Parameters | Meaning |
|---|---|
| dwCntrID | Application identifier for the current container application program |
| hWnd | The container application program's main window handle |
| lpRect | Pointer to the rectangle containing the dimensions of the client area of the container application program |
| dwReserved | Reserved |

Returns

TABLE 1-continued

If the function is successful, the return value is OLETEST_SUCCESS, otherwise it is OLETEST_FAILED.

--- cntrGetExeName
Description
This API function retrieves the name of the binary of the passed dwCntrID.
Parameters        Meaning

---

| | |
|---|---|
| dwCntrID | Application identifier for the current container application program |
| szName | Specifies the executable/path filled by this function |
| fPath | TRUE to include path info in szName, FALSE to exclude path info |
| dwReserved | Reserved |

Returns
If the function is successful, the return value is OLETEST_SUCCESS, otherwise it is OLETEST_FAILED.

--- cntrGetNumObjects
Description
This API function gets the number of embedded or linked objects in the container application program and places this value into the passed lpNumObjects. This function returns the number of objects that have been inserted into the container application program up to this time, including those objects that have been deleted. For example, if three objects have been inserted and one of them has been deleted, this function should return three objects.
Parameters        Meaning

---

| | |
|---|---|
| dwCntrID | Appplication identifier for the current container application program |
| hWnd | The container application program's main window handle |
| lpNumObjects | Pointer to LONG which is filled with the number of objects (embedded or linked) in the container application program |
| dwReserved | Reserved |

Returns
If the function is successful, the return value is OLETEST_SUCCESS, otherwise it is OLETEST_FAILED.

--- cntrSelectObject
Description
This API function selects the specified object from the passed dwObjectNum in the passe dwCntrID.
Parameters        Meaning

---

| | |
|---|---|
| dwCntrID | Application identifier for the current container application program |
| hWnd | The container application program's main window handle |
| dwObjectNum | Number of the object to select |
| dwReserved | Reserved |

Returns
If the function is successful, the return value is OLETEST_SUCCESS, otherwise it is OLETEST_FAILED.

--- cntrActivateObject
Description
Tkis API function activates the specified object in the passed dwObjectNum in the passed dwCntrID. Note that before an object can be activated, it must first be selected (see cntrSelectObject()).
Parameters        Meaning

---

| | |
|---|---|
| dwCntrID | Application identifier for the current container application program |
| hWnd | The container application program's main window handle, or NULL |
| dwObjectNum | The number of the object to activate - NULL activates current object |
| szVerb | The string containing the server's verb as it appears in the container application program's menu. |
| dwReserved | Reserved |

Returns
If the function is successful, the return value is OLETEST_SUCCESS, otherwise it is OLETEST_FAILED.

--- cntrSetState
Description
This API function sets the state of the container application program based on the

TABLE 1-continued passed cntrState. Through this function, the container application program may be minimized, maximized, hidden, or put at a specific location with a specific size. When doing drag drop operations, this function is called twice: once before the drop takes place, specifying ST_WILLDROP for the fDrop field of the cnfrState parameter, and once after the drop takes place, specifying ST_DROPDONE. This prepares the container application program for a drag/drop operation. If this API is not called for a drag/drop operation, the fDrop field should be zero. If the fDrop field of the cntrState parameter is either ST_WILLDROP or ST_DROPDONE, then this function pays no attention to the other fields of the parameter. If the application does not need to perform any special actions to prepare for a drag/drop operation, then this function returns with OLETEST_SUCCESS whenever the fDrop field is non-zero.

| Parameters | Meaning |
| --- | --- |
| dwCntrID | Application identifier for the current container application program |
| hWnd | The container application program's main window handle |
| cntrState | A pointer to a STATE structure to hold the values indicating the state of the container application program. The STATE structure has the following fields:<br>. hWnd - the window handle of the container application program<br>. fRunning - TRUE if the application is to be started<br>. fMinimized - TRUE if the window is to be minimized<br>. fHidden - TRUE if the window is to be hidden<br>. rWndPos - RECT structure containing location of window<br>. fDrop - Specifies the status of a Drag/Drop operation. It's values can be:<br>   . ST_WILLDROP - indicates that a drop is about to happen<br>   . ST_DROPDONE - indicates that a drop has happened |
| dwReserved | Reserved |

Returns
If the function is successful, the return value is OLETEST_SUCCESS, otherwise it is OLETEST_FAILED.

--- cntrGetState
Description
This API function gets the state of the container application program and fills the lpCntrState parameter with the current state of the container application program. This function should ignore the fDrop field. If the hWnd parameter is NULL, then this function fills the hWnd field with the window handle of the first occurrence of the application associated with dwCntrID.

| Parameters | Meaning |
| --- | --- |
| dwCntrID | Application identifier for the current container application program |
| hWnd | The container application program's main window handle, or NULL |
| lpCntrState | A STATE structure to hold the values indicating the state of the container application program. The STATE structure has the following fields:<br>. hWnd - the window handle of the container application program<br>. fRunning - TRUE if the application is running<br>. fMinimized - TRUE if the window is to be minimized<br>. fHidden - TRUE if the window is to be hidden<br>. rWndPos - RECT structure containing location of window<br>. fDrop - Specifies the status of a Drag/Drop operation. It's values can be:<br>   . ST_WILLDROP - indicates that a drop is about to happen<br>   . ST_DROPDONE - indicates that a drop has happened |
| dwReserved | Reserved |

Returns
If the function is successful, the return value is OLETEST_SUCCESS, otherwise it is OLETEST_FAILED.

--- srvrStart
Description
This API function starts an instance of a server with the passed dwSrvrID.

| Parameter | Meaning |
| --- | --- |
| dwSrvrID | Application identifier for the server to be started. |
| lphWnd | The window handle of the server after it's started. This |

TABLE 1-continued

|  | parameter is filled by this function |
| --- | --- |
| dwReserved | Reserved |

Returns
If the function is successful, the return value is OLETEST_SUCCESS, otherwise it is OLETEST_FAILED.

srvrSaveObject
Description
This API function saves the current server object to a file specified by the contents of the szDestFile parameter.

| Parameter | Meaning |
| --- | --- |
| dwSrvrID | Application identifier for the current server |
| hWnd | The server's main window handle |
| szDestFile | Destination file |
| fReplace | TRUE to overwrite file if it exists, FALSE to not overwrite the file |
| dwReserved | Reserved |

Returns
If the function is successful, the return value is OLETEST_SUCCESS, otherwise it is OLETEST_FAILED.

srvrClose
Description
This API function closes the instance of the server with the passed dwSrvrID. If the value of hWnd is NULL, then this function closes the first instance of the application associated with dwSrvrID. This function verifies that the window was actually closed by testing the validity of the window handle after the close was attempted.

| Parameter | Meaning |
| --- | --- |
| dwSrvrID | Application identifier for the current server |
| hWnd | The handle of the main window of the container application program to be closed |
| dwReserved | Reserved |

Returns
If the function is successful, the return value is OLETEST_SUCCESS, otherwise it is OLETEST_FAILED.

srvrChangeObject
Description
This API function changes the state of an object in the server based on the passed dwState. The state to which the server changes the object is specific to each server. For Microsoft Word, for example, the response to CHG_ADD might be to enter some text, while the response to CHG_PRES2 might be to change the font of that text.
Also, support functions have been provided to enable servers to keep track of objects which have been inserted into them.

| Parameter | Meaning |
| --- | --- |
| dwSrvrID | Application identifier for the current server |
| hWnd | The server's main window handle |
| dwState | State to which to change the object. There are four values that this parameter can have:<br>. CHG_ADD - an object should be created<br>. CHG_PRES1 - return the object to its original appearance<br>. CHG_PRES2 - change the object to a second appearance<br>. CHG_PRES3 - change the object to a third appearance |
| dwReserved | Reserved |

Returns
If the function is successful, the return value is OLETEST_SUCCESS, otherwise it is OLETEST_FAILED. Returning successfully from a call to this function indicates that the server has one more object in it than when the call was made.

srvrSelectObject
Description
The API function designates the object specified by the passed dwObjectNum the current object in the server.

| Parameter | Meaning |
| --- | --- |
| dwSrvrID | Application identifier for the current server |
| hWnd | The server's main window handle |
| dwObjectNum | Object to select |
| dwReserved | Reserved |

Returns
If the function is successful, the return value is OLETEST_SUCCESS, otherwise it is OLETEST_FAILED. Returning successfully from a call to this function indicates that the server has one more object in it than when the call was made.

srvrLoadObjectFromFile

TABLE 1-continued

Description
The API function loads an object specified by the passed szSrcFile into the server
specified by the passed dwSrvrID.

| Parameter | Meaning |
|---|---|
| dwSrvrID | Application identifier for the current server |
| hWnd | The server's main window handle |
| szSrcFile | The source file to load into server |
| fUpdate | TRUE to update any links, FALSE if not |
| dwReserved | Reserved |

Returns
If the function is successful, the return value is OLETEST_SUCCESS, otherwise it is OLETEST_FAILED.

--- srvrCopyObject
Description
The API function copies the currently selected object in the passed dwSrvrID to the clipboard.

| Parameter | Meaning |
|---|---|
| dwSrvrID | Application identifier for the current server |
| hWnd | The server's main window handle |
| dwReserved | Reserved |

Returns
If the function is successful, the return value is OLETEST_SUCCESS, otherwise it is OLETEST_FAILED.

--- srvrPaste
Description
The API function pastes the contents of the clipboard into the passed dwSrvrID.

| Parameter | Meaning |
|---|---|
| dwSrvrID | Application identifier for the current server |
| hWnd | The server's main window handle |
| dwReserved | Reserved |

Returns
If the function is successful, the return value is OLETEST_SUCCESS, otherwise it is OLETEST_FAILED.

--- srvrDrag
Description
The API function performs mouse clicks and movement to "drag" a server object (holding left mouse button down) from its location in the server to the position specified by the passed X and Y coordinates and releases the left mouse button to "drop" the server object into the position specified by the X and Y coordinates. The fLink and fCopy arguments specify additional keys to hold down while dragging these are predefined by the OLE user interface guidelines (e.g., Ctrl + drag is a copy, Shift + drag is a link).

| Parameter | Meaning |
|---|---|
| dwSrvrID | Application identifier for the current server |
| hWnd | The server's main window handle |
| fLink | TRUE to drag a link, FALSE if not |
| fCopy | TRUE to drag a copy, FALSE if not |
| X | X coordinates of the drop point |
| Y | Y coordinates of the drop point |
| dwReserved | Reserved |

Returns
If the function is successful, the return value is OLETEST_SUCCESS, otherwise it is OLETEST_FAILED.

--- srvrGetExeName
Description
The API function fills the passed szName parameter with the executable name of the passed dwSrvrID.

| Parameter | Meaning |
|---|---|
| dwSrvrID | Application identifier for the current server |
| szName | Buffer to hold the name of the executable. |
| fPath | TRUE to include path info in szName, FALSE if not |
| dwReserved | Reserved |

Returns
If the function is successful, the return value is OLETEST_SUCCESS, otherwise it is OLETEST_FAILED.

--- srvrGetClassName
Description
The API function fills the passed szName with the server classname as it appears in the insert object dialog box.

TABLE 1-continued

| Parameter | Meaning |
| --- | --- |
| dwSrvrID | Application identifier for the current server |
| szName | Buffer to hold the name of the server class |
| dwReserved | Reserved |

Returns

If the function is successful, the return value is OLETEST_SUCCESS, otherwise it is OLETEST_FAILED.

srvrSetState

Description

The API function sets the state of a server appplication based on the passed dwSrvrState. If hWnd is NULL, then the hWnd field is filled with the window handle of the first instance of the application's main window. Also, if fRunning is FALSE, then the application is closed.

| Parameter | Meaning |
| --- | --- |
| dwSrvrID | Application identifier for the current server |
| hWnd | The window handle of the server |
| dwSrvrState | A pointer to a STATE structure to hold the values indicating the state of the container application program. The STATE structure has the following fields:<br>. hWnd - the window handle of the container application program<br>. fRunning - TRUE if the application is to be started<br>. fMinimized - TRUE if the window is to be minimized<br>. fHidden - TRUE if the window is to be hidden<br>. rWndPos - RECT stucture containing location of window<br>. fDrop - should be ignored by this function |
| dwReserved | Reserved |

Returns

If the function is successful, the return value is OLETEST_SUCCESS, otherwise it is OLETEST_FAILED.

srvrGetState

Description

The API function returns the state of the passed dwSrvrID in the passed dwSrvrState.

| Parameter | Meaning |
| --- | --- |
| dwSrvrID | Application identifier for the current server |
| hWnd | The window handle of the server |
| dwSrvrState | The state of server |
| dwReserved | Reserved |

Returns

If the function is successful, the return value is OLETEST_SUCCESS, otherwise it is OLETEST_FAILED.

srvrGetVerb

Description

This API function fills the passed szVerb parameter with the verb associated with the passed dwSrvID based on the valued in the passed dwVerbID.

| Parameter | Meaning |
| --- | --- |
| dwSrvrID | ID for the current server |
| dwVerbID | Identifier denoting which verb to retrieve. Currently, this parameter can have a value of VERB_ACTIVATE |
| szVerb | Buffer to hold the verb |
| dwReserved | Reserved |

Returns

If the function is successful, the return value is OLETEST_SUCCESS, otherwise it is OLETEST_FAILED.

Support Functions

The interoperability testing system provides various support functions. A test script calls these support functions in order to retrieve information from the database. The GetContainers function is an example of a support function. The test script calls the GetContainers function with the number of container application programs requested. The GetContainers function determines whether the combinations table has already been built. If it has not been built, the GetContainers function builds the combinations table. If it has been built, the GetContainers function calls the GetRunCount function to obtain the current run count of the test script. The current run count indicates the combination entry from the combinations table which the test script should be run with. The GetRunCount function obtains the current run count which the interoperability testing system maintains. Then, the GetContainers function retrieves the application identifiers for the requested container application programs from the combinations table using the run count.

The following table contains a description of the support functions.

TABLE 2

GetBinary
Description
This support function retrieves the name of the executable file associated with the passed dwID. The name of the executable is specified by the AppName entry under the instance section of the passed dwID in the database. This function is called by the cntr/srvrStart() and cntr/srvrGetExeName() methods to determine the name of the executable file.

| Parameters | Meaning |
| --- | --- |
| dwID | Application identifier |
| szOut | Buffer to hold the name of the binary |

Returns
If the function is supported, the return value is TRUE, otherwise it is FALSE.

GetCaption
Description
This support function retrieves the text of the caption of the main window for the passed dwID. The text of the window is specified by the Caption entry under the instance section of the passed dwID in the database. This function is typically called in order to determine whether if the application has been successfully started.

| Parameter | Meaning |
| --- | --- |
| dwID | Application identifier |
| szOut | Buffer to hold the Caption of the binary's main window by the function |

Returns
If the function is supported, the return value is TRUE, otherwise it is FALSE.

GetClass
(dwID as LONG, szOut$) as INTEGER
Description
This support function retrieves the name of the class of the object associated with the passed dwID. The name of the class is specified by the ClassName entry under the instance section of the passed dwID im the database.

| Parameters | Meaning |
| --- | --- |
| dwID | Application identifier |
| szOut | Buffer to hold the name of the class |

Returns
If the function is supported, the return value is TRUE, otherwise it is FALSE.

GetExtension
Description
This support function retrieves the extension that the application associated with passed dwID uses when saving files. The extension is specifically the Ext entry under the instance section of the passed dwID in the database.

| Parameter | Meaning |
| --- | --- |
| dwID | Application identifier |
| szOut | Buffer to hold the file extension |

Returns
If the function is supported, the return value is TRUE, otherwise it is FALSE.

GetIDEntry
Description
This support function retrieves information from the database for the passed dwID based on the passed szEntry.

| Parameter | Meaning |
| --- | --- |
| dwID | Application identifier |
| szEntry | The entry containing the information to retrieve. Since any user-defined information can be placed in the database, any string can be passed as this parameter. Some constants are supplied for retrieving the information that must be present. These constants are:<br>. APPNAME - causes the name of the binary to be retrieved<br>. OBJCLASS - causes the object class name to be retrieved<br>. WNDCLASS - causes the main window class to be retrieved<br>. CAPTION - causes the main window caption to be retrieved<br>. EXT - causes the file extension to be retrieved<br>. DATA1 - causes the first data file name to be retrieved<br>. DATA2 - causes the second data file name to be retrieved<br>. DATA3 - causes the third data file name to be retrieved |

TABLE 2-continued

| | |
|---|---|
| | DATA4 - causes the fourth data file name to be retrieved |
| szOut | Buffer to hold the file extension |
| Returns | |
| If the function is supported, the return value is TRUE, otherwise it is FALSE. | |

IsPropSupported
Description
This support function determines whether the passed dwID has the property specified by the passed szProp.

| Parameter | Meaning |
|---|---|
| dwID | Application identifier |
| szProp | String containing the property to check for |
| Returns | |
| If the property is supported, the return value is TRUE, otherwise it is FALSE. | |

AddAppObject
Description
This support function modifies the database when an object has been added to the application associated with dwID. Each application identifier has a data structure associated with it which is maintained in the database to help the application identifier keep track of its objects. There are a maximum of 10 objects that an application identifier may have. Calling this support function will modify the database to indicate that the dwObjectNumth object has just been added.

| Parameter | Meaning |
|---|---|
| dwID | Application identifier |
| dwObjectNum | Number of the object being added |
| Returns | |
| If the function is supported, the return value is TRUE, otherwise it is FALSE. | |

IsAppObjectPresent
Description
This support function queries whether an object specified by the passed dwObjectNum is present in the passed dwID. Each application identifier has a data structure associated with it which is maintained in the database to help the application identifier keep track of its objects. There are a maximum of 10 objects that an application identifier may have. Calling this support function will modify the database to indicate that the dwObjectNumth object has just been added.

| Parameter | Meaning |
|---|---|
| dwID | Application identifier |
| dwObjectNum | Number of the object |
| Returns | |
| If the property is supported, the return value is TRUE, otherwise it is FALSE. | |

DeleteAppObject
Description
This support function modifies the database when an object specified by the passed dwObjectNum has been deleted. Each application identifier has a data structure associated with it which is maintained in the database to help the application identifier keep track of its objects. There are a maximum of 10 objects that an application identifier may have. Calling this support function will modify the database to indicate that the dwObjectNumth object has just been added.

| Parameter | Meaning |
|---|---|
| dwID | Application identifier |
| dwObjectNum | Number of the object to be deleted |
| Returns | |
| If the function is supported, the return value is TRUE, otherwise it is FALSE. | |

MarkObjectAsSelected
Description
This support function sets an object specified by the passed dwObjectNum as being currently selected. Each application identifier has a data structure associated with it which is maintained in the database to help the application identifier keep track of its objects. There are a maximum of 10 objects that an application identifier may have. Calling this support function will modify the database to indicate that the dwObjectNumth object has just been added.

| Parameter | Meaning |
|---|---|
| dwID | Application identifier |
| dwObjectNum | Number of the object to mark as selected |
| Returns | |
| If the function is supported, the return value is TRUE, otherwise it is FALSE. | |

GetSelectedAppObject
Description

TABLE 2-continued

This support function returns the number of the currently selected object.
Each application identifier has a data structure associated with it which is maintained in
the database to help the application identifier keep track of its objects. There are a
maximum of 10 objects that an application identifier may have. Calling this support
function will modify the database to indicate that the dwObjectNumth object has just
been added.

| Parameter | Meaning |
|---|---|
| dwID | Application identifier |

Returns
If no object has been marked as selected, the return value is zero, otherwise it is the
number of the object currently marked as selected.

---

GetNumAppObjects
Description
This support function returns the number of objects that have been placed into the
application.
Each application identifier has a data structure associated with it which is maintained in
the database to help the application identifier keep track of its objects. There are a
maximum of 10 objects that an application identifier may have. Calling this support
function will modify the database to indicate that the dwObjectNumth object has just
been added.

| Parameter | Meaning |
|---|---|
| dwID | Application identifier |

Returns
The return value is the number of objects that have been added to the application.

---

GetContainers
Description
This support function retrieves an array of the passed nNum container application
programs based on the passed nIter.

| Parameter | Meaning |
|---|---|
| nNum | Number of container application programs requested |
| nIter | The current run count of the script |

Returns
If the function is successful, the return value is a pointer to an array of integers which
contains the IDs for the container application programs, otherwise it is NULL.

---

GetServers
Description
This support function retrieves an array of the passed nNum servers based on the passed
nIter.

| Parameter | Meaning |
|---|---|
| nNum | Number of servers requested |
| nIter | The current run count of the script |

Returns
If the function is successful, the return value is a pointer to an array of integers which
contains the IDs for the servers, otherwise it is NULL.

---

GetRunCount
no parameters
Description
This support function retrieves the current iteration of the test script.
Returns
If the test script is being run by the driver, the return value is the current iteration of the
test script, otherwise it is zero.

---

Zfunctions

The interoperability testing system provides Zfunctions that may be used by the callback functions to simulate user activity, such as clicking a mouse button, or to retrieve information from the database, such as the Caption entry for an application identifier. Zfunctions have a one-to-one correspondence with Microsoft Test control functions. Zfunctions, however, are wrapper functions which provide error testing and logging in addition to what Microsoft Test control functions provide.

One example of a Zfunction is the ZMenuEx function. Code Table 1 contains pseudocode of a sample implementation of the ZMenuEx function.

Code TABLE 1

```
BOOL WINAPIV ZMenuEx(LPSTR lpszMenu, ... )
{
    V_LIST      lpParms;
    LPSTR       lpString;
    char        szLocalText[MAX_LOCAL_STRING];
    BOOL        bRet = FALSE;
    // Check if the menu exists
    if( GetLocalText((DWORD)lpszMenu, szLocalText)&&
        WMenuExists(szLocalText, NULL))
    {
        // The menu item exists, so select it
        WMenuEx(szLocalText, NULL);
        bRet = MTTRUE;
```

Code TABLE 1-continued

```
Get next parameter passed;
for each actual parameter passed
{
    // Check if the menu item exists.
    if( GetLocalText((DWORD)lpString, szLocalText)&&
        (bRet = WMenuExists(szLocalText, NULL)))
    {
        // The menu item exists, so select it.
        WMenuEx(szLocalText, NULL);
        bRet = MTTRUE;
    }
    else
    {
        bRet = FALSE;
        WMenuEnd();
    }
}
else
{
    log error;
    bRet = MTTRUE;
}
}
return( bRet );
}
```

The ZMenuEx function receives a variable parameter list of menu commands. A menu command is either a menu or a menu item. The ZMenuEx function sends the appropriate events to the application program to select the specified menu items. In a preferred embodiment of the present invention, the ZMenuEx function sends messages indicative of events to the application program. The application program processes the messages to select the menu items specified by the messages. The ZMenuEx function may be called with a variable number of parameters such as ZMenuEx("&File", "&Open"). In this case, the ZMenuEx function would select the "File" menu and the "Open" menu item.

When the ZMenuEx function is called with a parameter list of constants (e.g., (CNT_WORD_FILE, CNT_WORD_OPEN)), the ZMenuEx function calls the GetLocalText function in order to map the constants to the local language (e.g., German). The ZMenuEx function calls the WMenuExists function to determine whether the menu command exists. If the menu command does exist, the ZMenuEx function calls the WMenuEx function to actually search for the menu command on the menu and to select the menu command. The WMenuEx function is a Microsoft Test function. Then, the ZMenuEx function processes each other menu command in the same manner.

Test Script

A test writer writes an application-independent test script using high-level application independent commands. Each high-level command is specified as a call to an API function. The following, is a sample test script in pseudocode for test script OT01001.mst 528. Test script OT01001.mst inserts an object from a server application program into a container application program.

Code TABLE 2

```
'***** Variable Declarations ******************************
DIM cID as LONG 'container application program ID num
DIM sID as LONG 'server ID num
DIM CntrWnd as INTEGER'window handle for container application program
DIM SrvrWnd as INTEGER'window handle for server
DIM nRet as INTEGER   'return variable for test fail
DIM CntrList as POINTER to LONG 'List of container application programs
DIM SrvrList as POINTER to LONG 'List of servers
DIM dwUserDef as LONG 'reserved variable
DIM nCntrs as INTEGER 'number of requested container application programs
DIM nSrvrs as INTEGER 'number of requested servers
DIM fSrvrClose as INTEGER'BOOL close server after create
DIM srvrState as STATE'STATE variable to hold srvr state
DIM fLink as INTEGER'BOOL link to object
DIM fIcon as INTEGER'BOOL display as Icon
DIM fLog as INTEGER'BOOL log results
DIM szTestName as STRING'Number / name of test
DIM szTestDescription as STRING'Description of test
DIM szVerb as STRING * OLETEST_STRING 'activation verb
'**********************************************************
nCntrs = 1 'number of container application programs to request from
GetContainers nSrvrs = 1 'number of servers to request from GetServers
szTestName = "OT01001"
szTestDescription = "Insert Object and Activate"
nRet=Initialize(szTestName, szTestDescription)
GetAppIDs(CntrList, nCntrs, SrvrList, nSrvrs)
'***** Variable Initialization *****
cID = CntrList[0]'container application program 1
sID = SrvrList[0]'server 1
fSrvrClose = TRUE'close server
fLink = FALSE'link to file
fIcon = FALSE'display as icon
fLog = TRUE 'log results
'**********************************
IF (cntrStart(cID, VARPTR(CntrWnd),dwUserDef)) = OLETEST_SUCCESS Then
CreateObject (cID, CntrWnd, sID, SrvrWnd, OT_INSERT, fSrvrClose, fLink,
fIcon, fLog, dwUserDef)
    End
ENDIF
END FUNCTION
```

First, the test script calls the Initialize function. The Initialize function provides the interoperability testing system with the name and description of the test script. Using this, the interoperability testing system identifies the test script section from which it may retrieve test script information for this test script from the database.

Next, the test script calls the GetAppIDs function to obtain the list of container application programs and server application programs needed by the test script. The interoperability testing system provides the GetAppIDs function, which is a wrapper function that calls API functions.

Then the test script calls API functions to test the interoperability of the container application programs and server application programs. In the test script of Code Table 2, the test script calls the cntrStart function (i.e., an API function). The cntrStart function creates an instance of the container application program. If the cntrStart API function is successful, then the test script calls the CreateObject function. The CreateObject function is a wrapper function which calls API functions to obtain an object from a server application program and insert the object into a container application program.

The following is a sample pseudocode implementation of the GetAppIds function.

Code TABLE 3

```
FUNCTION GetAppIDs (lpCntrList as POINTER TO LONG, nCntrs as INTEGER,
lpSrvrList as POINTER TO LONG, nSrvrs as INTEGER) as INTEGER
    GetAppIDs = TRUE
    lpCntrList = GetContainers(nCntrs, GetRunCount)
    if lpCntrList = NULL then
       GetAppIDs = FALSE
    endif
    lpSrvrList = GetServers(nSrvrs, GetRunCount)
    if lpSrvrList = NULL then
       GetAppIDs = FALSE
    endif
END FUNCTION
```

When the GetAppIDs function calls the GetContainers function, the GetContainers function determines whether the combinations table has already been built. If the combinations table has not been built, the GetContainers function generates the combinations table based upon the test script information which provides the number of container application programs and server application programs that are needed by the test script. When a combinations table is available, the GetContainers function returns a list of application identifiers of container application programs which are to be used by the test script. Then, the GetAppIDs function calls the GetServers function. The GetServers function returns a list of application identifiers of server application programs which are to be used by the test script.

The following is a sample pseudocode implementation of the CreateObject function.

Code TABLE 4

```
FUNCTION CreateObject (CntrID as LONG, lpCntrWnd%, SrvrID as
LONG, lpSrvrWnd%, dwMethod%, fSrvrClose%,fLink%,fIcon%,fLog%,
dwReserved%)
as INTEGER
'where szCntr is container application program exe name
'    szSrvr is server exe name
'    dwMethod%method of creation (see oleconst.inc)
'    fFile% = BOOL create from file
'    fLink% = BOOL is it link
'    fIcon% = BOOL Create as Icon or not
```

Code TABLE 4-continued

```
'    fLog% = BOOL - use standard logging or not
'    dwReserved% = for future use
'NOTE: the OLETEST_STRING multiplier is required to fill string
params in the DLL
Dim SrvrClassName as STRING * OLETEST_STRING
Dim szExt as STRING
Dim szDestFile as STRING
Dim szSrcFile as STRING
Dim lpX as INTEGER
Dim lpY as INTEGER
Dim lpRect as RECT
DIM srvrState as STATE
szExt$    =STRING$(OLETEST_STRING, 0)
szDestFile$ =STRING$(OLETEST_STRING, 0)
szSrcFile$ =STRING$(OLETEST_STRING, 0)
CreateObject=OLETEST_FAILED
           if srvrGetClassName(SrvrID, SrvrClassName, RESERVED)=
OLETEST_SUCCESS then
                if(cntrInsertObject(CntrID, lpCntrWnd,
SrvrClassName, fIcon%, RESERVED)) then
                     CreateObject=OLETEST_SUCCESS
                endif
           endif
END FUNCTION
```

The CreateObject function first obtains the class name of the object to insert by calling the SrvrGetClassName function. Then, the CreateObject function inserts an object of the retrieved class into the container application program by calling the CntrInsertObject function.

Callback Functions

The application developer preferably implements application-specific callback functions. An application-specific callback function is the actual code which implements a high-level command of the test script. For each container application program, an application developer implements an application-specific callback function for each API function in a container DLL. For each server application program, an application developer implements an application-specific callback function for each API function in a server DLL. The following is a sample pseudocode application-specific callback function corresponding to the cntrStart API function which starts an Excel application program.

Code TABLE 5

```
'FUNCTION EXCEL_START(CntrID as LONG,
lphWnd as POINT TO INTEGER, dwReserved as LONG) AS INTEGER
    DIM    hWnd as INTEGER
    DIM    hWndArr as INTEGER
    DIM    szApp as STRING
    DIM    szCap as STRING
```

Code TABLE 5-continued

```
DIM x as INTEGER
DIM ret as INTEGER
szApp$ = STRING$(OLETEST_STRING, 0)
szCap$ = STRING$(OLETEST_STRING, 0)
x = GetIDEntry(CntrID, APPNAME, szApp$)
x = GetIDEntry(CntrID, CAPTION, szCap$)
ret = Run(szApp$)
if ret = 0 then
    ZMenuEx("&Window", "&Arrange ...")
    EXCEL_START=OLETEST_SUCCESS
else
    Log Error("Excel could not be launched")
    EXCEL_START=OLETEST_FAILED
endif
END FUNCTION
```

The EXCEL_START function first retrieves the application name and caption for the container application program from the database by calling the GetIDEntry function. Then the EXCEL_START function calls Run, a Microsoft Test command, to start the container application program, which in this case is the EXCEL application program. Next, if the Run command was a success and the container application program was started, the EXCEL_START function calls ZMenuEx to select the "Window" menu and the "Arrange" menu item, and the EXCEL_START function also returns a flag indicating success. If the Run command was not a success, then the error is logged and the EXCEL_START function returns a flag indicating the command was not a success.

In addition, the application developer generates a callback function table for each application identifier. The application developer then passes each application identifier with a pointer to its callback function table to the interoperability testing system. The following is a sample of pseudocode which maps the application-independent API functions implemented for an application identifier to application-specific callback functions.

CODE TABLE 6

```
DIM CExcel as VTCNTR
DIM ptrCExcel as POINTER to VTCNTR
CExcel.appStart        = VARPTR(EXCEL_START)
CExcel.appInsertObject = VARPTR(EXCEL_INSERT)
ptrCExcel = VARPTR(CExcel)
```

The following pseudocode calls the InitCVtbl function. The InitCVtbl function enters the application identifier name, the function table, and the language file which is to be used by the application-specific callback functions into the database.

CODE TABLE 7

```
$INCLUDE 'cnt_xl.mst'  * Implements Application-Specific Functions
$INCLUDE 'cnt_xl.vtb'  * Defines Function Table
if InitCVtbl(ptrCExcel, "CNT_EXCELSHEET16", NULL) = -1 or _
InitCVtbl(ptrCExcel, "CNT_EXCELSHEET32", NULL) = -1 then
Print "Failure initializing CNT_EXCELSHEET16 or CNT_
EXCELSHEET32" END
endif
```

EXAMPLE

The following example illustrates the execution of the OT01001.mst test script of Code Table 2. The test script starts a container application program and inserts an object from a server application program into the container application program.

When the test script is executed, the test script first calls the Initialize function to provide the interoperability testing system with the name and description of the test. Using the name of the test, the interoperability testing system can access the appropriate test script section in the test script information table in the database. Then, the test script calls the GetAppIDs function to obtain a container application program and a server application program. The GetAppIDs function first calls the GetContainers function to obtain a container application program. The GetContainers function determines whether the combinations table has been built. For this example, the combinations table has been built and stored in the database. Since the combinations table has been built, the GetContainers function calls the GetRunCount function to determine which combination from the combinations table should be used for this particular run of the test script. For this example, the GetRunCount function returns four. Typically, however, when a test is run from a test script, the GetRunCount function returns zero, indicating that the first combination in the combinations table should be used. Next, the GetContainers function obtains the application identifier of the container application programs for this test run by accessing the entry with run count four from the combinations table. The GetContainers function retrieves the CNT_WORDDOC16 application identifier for the container application program. Next, the GetAppIDs function calls the GetServers function. The GetServers function obtains the run count by calling the GetRunCount function and then obtains the SVR_EXCELSHEET16 application identifier for the server application program. The GetAppIDs function returns the application identifiers for the container application program and server application program to the test script.

Figure 8:
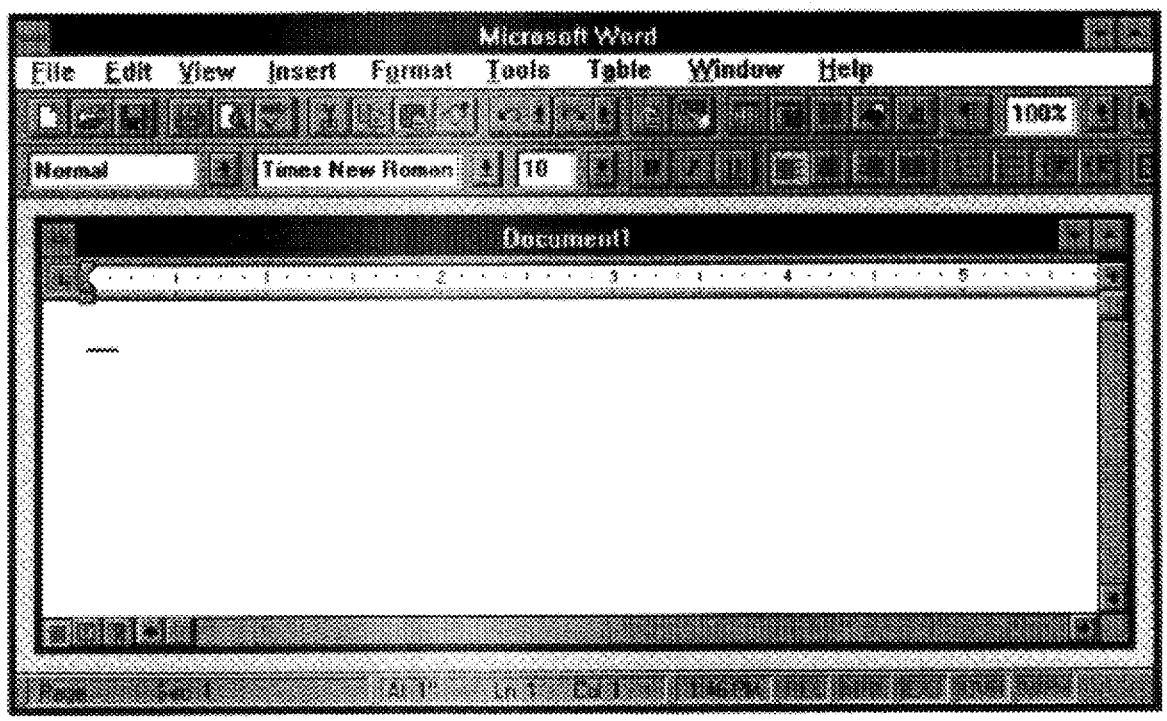
FIG. 8 illustrates an instantiation of a container application program.

The test script then calls the cntrStart function with the application identifier to start the container application program. When the test script calls an API function, the interoperability testing system accesses the application identifier table with the passed application identifier CNT_WORDDOC16. Then, the interoperability testing system finds the entry containing the application identifier 711 in the application identifier table and retrieves the corresponding pointer to a callback function table 712. Next, the interoperability testing system accesses the callback function table and finds the entry containing the cntrStart function 714. From this entry, the interoperability testing system retrieves the pointer to the corresponding callback function 716. Using the pointer to the callback function, the interoperability testing system accesses the application-specific callback function, Word_Start 718, and executes this function. The Word_Start function creates an instance of the container application program for the CNT_WORDDOC16 application identifier, which represents a 16-bit Word document. FIG. 8 illustrates an instantiation of the container application program with the CNT_WORDDOC16 application identifier.

The test script then calls the CreateObject function. The CreateObject function first calls the srvrGetClassName function. Again, the interoperability method accesses the application identifier table and finds the corresponding application-specific callback function for the srvrGetClassName function, which is the Excel_GetClassName function 730. The interoperability testing system then executes the Excel_GetClassName function. The Excel_GetClassName function retrieves the class name of the SVR_EXCELSHEET16 application identifier from the ObjClass entry of the SVR_EXCELSHEET16 application identifier section of the database. This entry contains "Microsoft Excel 5.0 Worksheet" 430. The Excel__GetClassName function returns "Microsoft Excel 5.0 Worksheet." The CreateObject function then calls the cntrInsertObject function. The interoperability testing system accesses the application identifier table and finds the corresponding application-specific callback function for the cntrInsertObject function, which is the Word__InsertObject function 732. The interoperability method executes the Word__InsertObject function.

Figure 9:
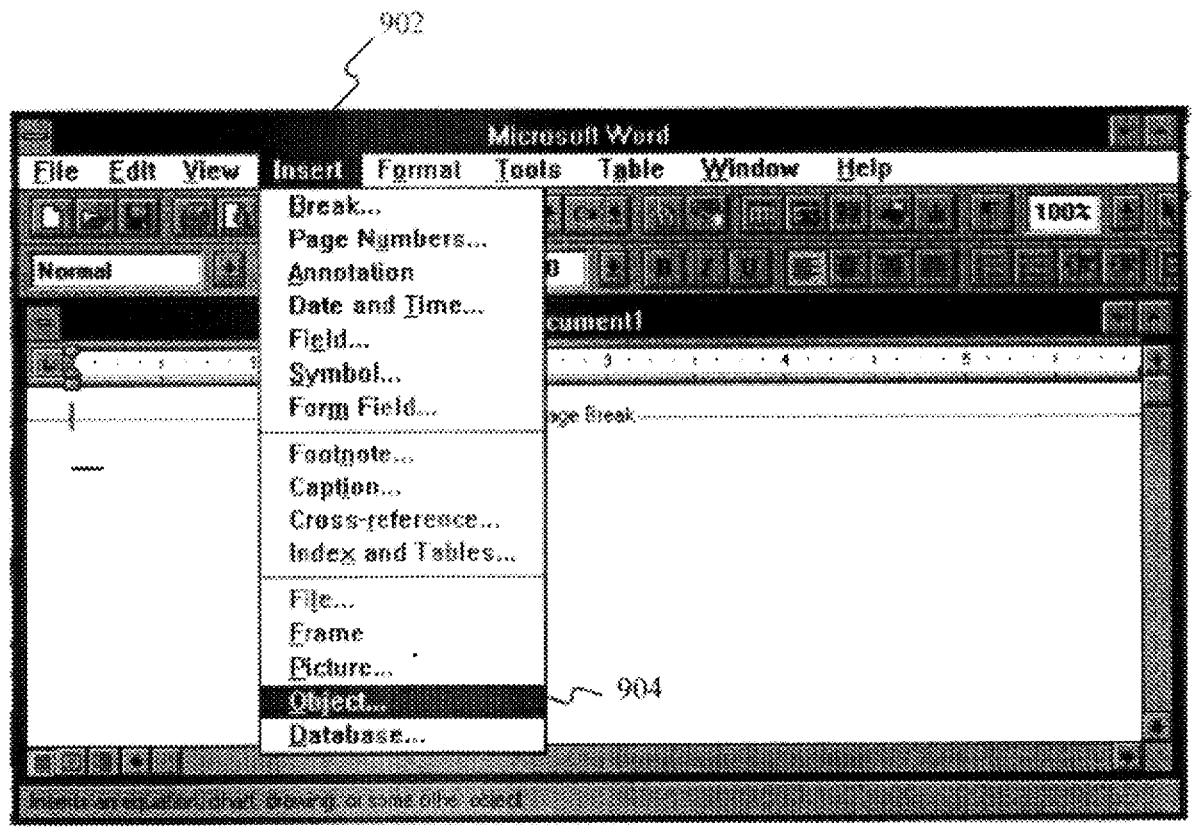
FIG. 9 illustrates a container application program which has received a message to select the "Insert" menu command.
Figure 10:
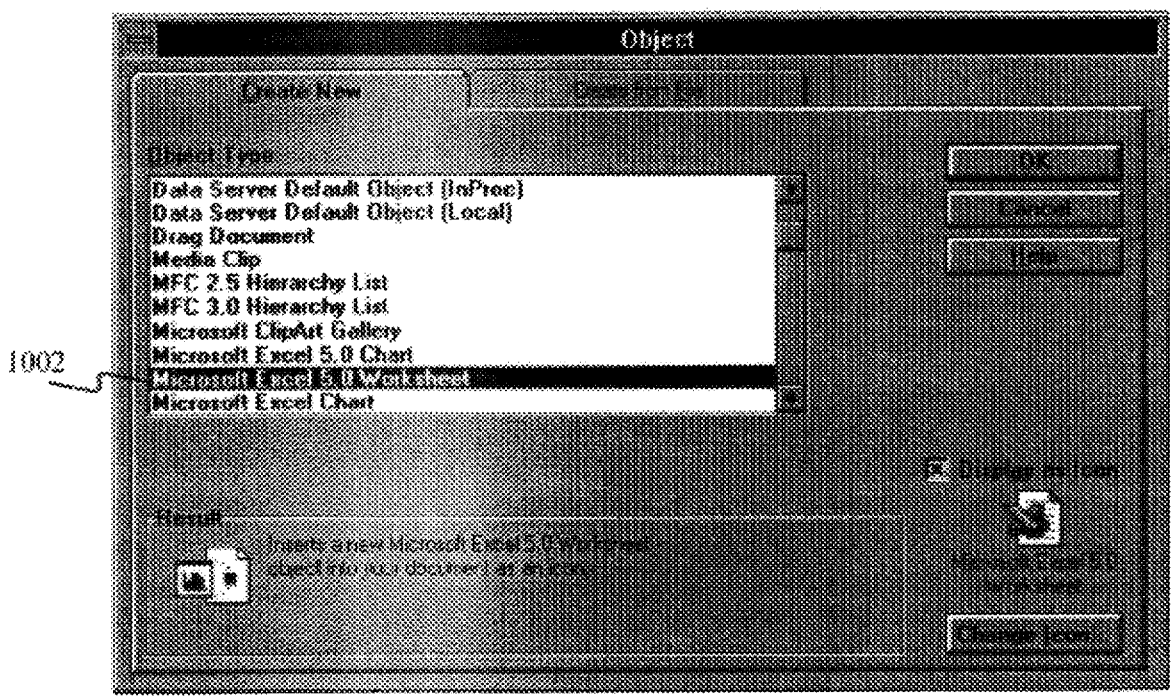
FIG. 10 illustrates a sample dialog box.
Figure 11:
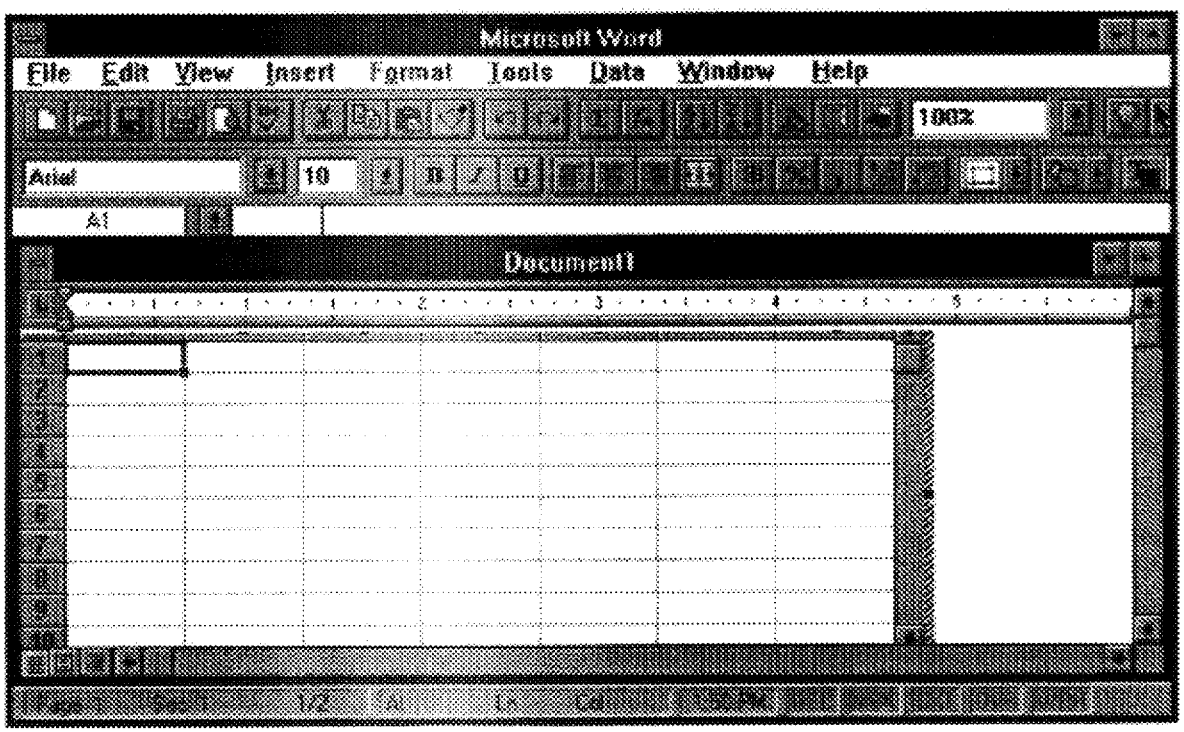
FIG. 11 illustrates the container application program with an object inserted.

The Word__InsertObject function calls the ZMenuEx function to select the "Insert" and "Object" menu commands in the container application program. After determining that the menu exists, the ZMenuEx function sends a message to the container application program to select the "Insert" command from the menu. Then, the ZMenuEx function sends a message to the container application program to select the "Object" menu command. FIG. 9 illustrates a container application program which has received a message to select the "Insert" and "Object" menu commands. The "Insert" menu command 902 has been selected, and the "Object" menu command 940 has been selected. After selecting the "Insert" and "Object" menu commands, the container application program opens a dialog box. FIG. 10 illustrates a sample dialog box. The Word__InsertObject function then sends a message to the container application program to select the object class of the server application program in the dialog box, which is "Microsoft Excel 5.0 Worksheet" 1002. As discussed above, the CreateObject function called the srvrGetClassName function to obtain the object class of the server application program. When the container application program processes the message and selects the object class of the server application program, an object of that class is inserted into the container application program. FIG. 11 illustrates the container application program with the CNT__WORDDOC16 application identifier which now has an object provided by the server application program with the application identifier SVR__EXCELSHEET16.

Discussion of Flowcharts

Figure 12:
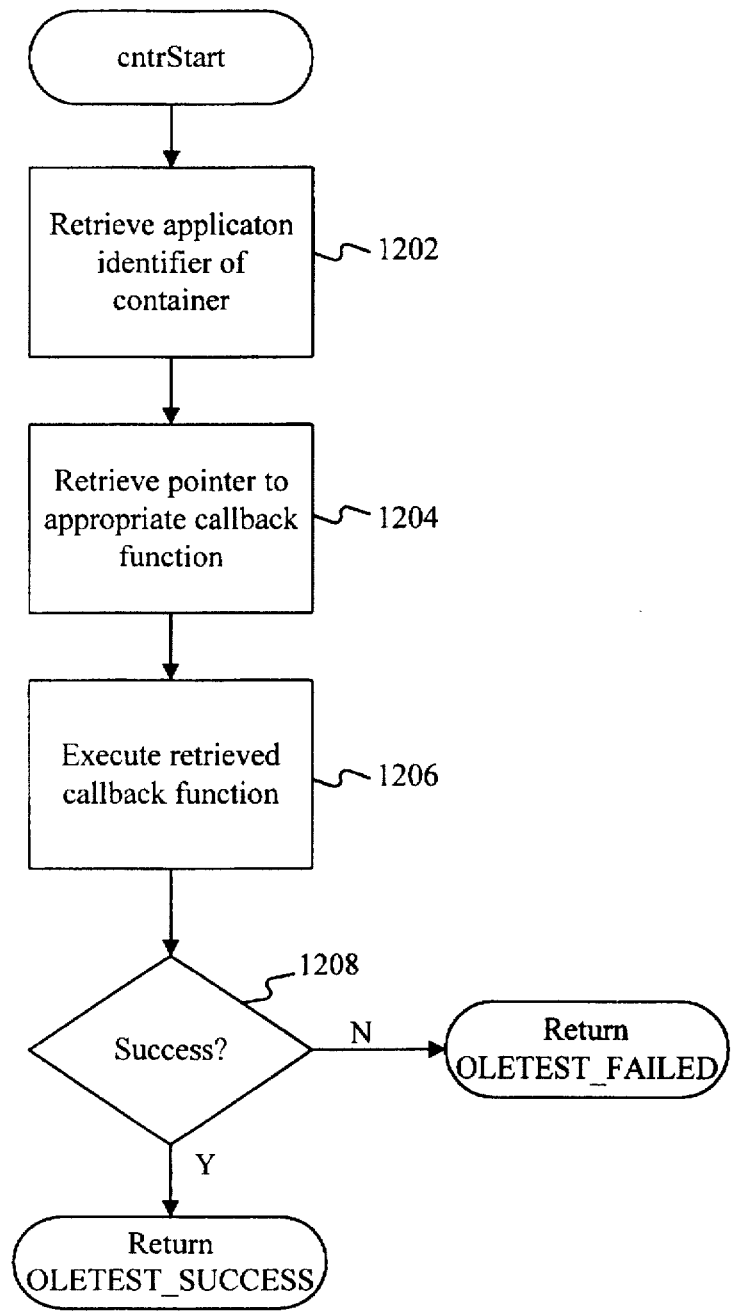
FIG. 12 illustrates an overview flow diagram of the cntrStart function.

FIG. 12 illustrates an overview flow diagram of the cntrStart function. The cntrStart function is called by a test script to start a container application program. In step 1202, the cntrStart function retrieves the application identifier for a container application program that is passed by the invoking test script. In step 1204, the cntrStart function retrieves a pointer to a corresponding application-specific callback function using the application identifier table and callback function table for the application identifier. In step 1206, the cntrStart function executes the retrieved application-specific callback function. In step 1208, if the execution of the application-specific callback function was successful, the cntrStart function returns OLETEST__SUCCESS, else the cntrStart function returns OLETEST__FAILED.

Figure 13:
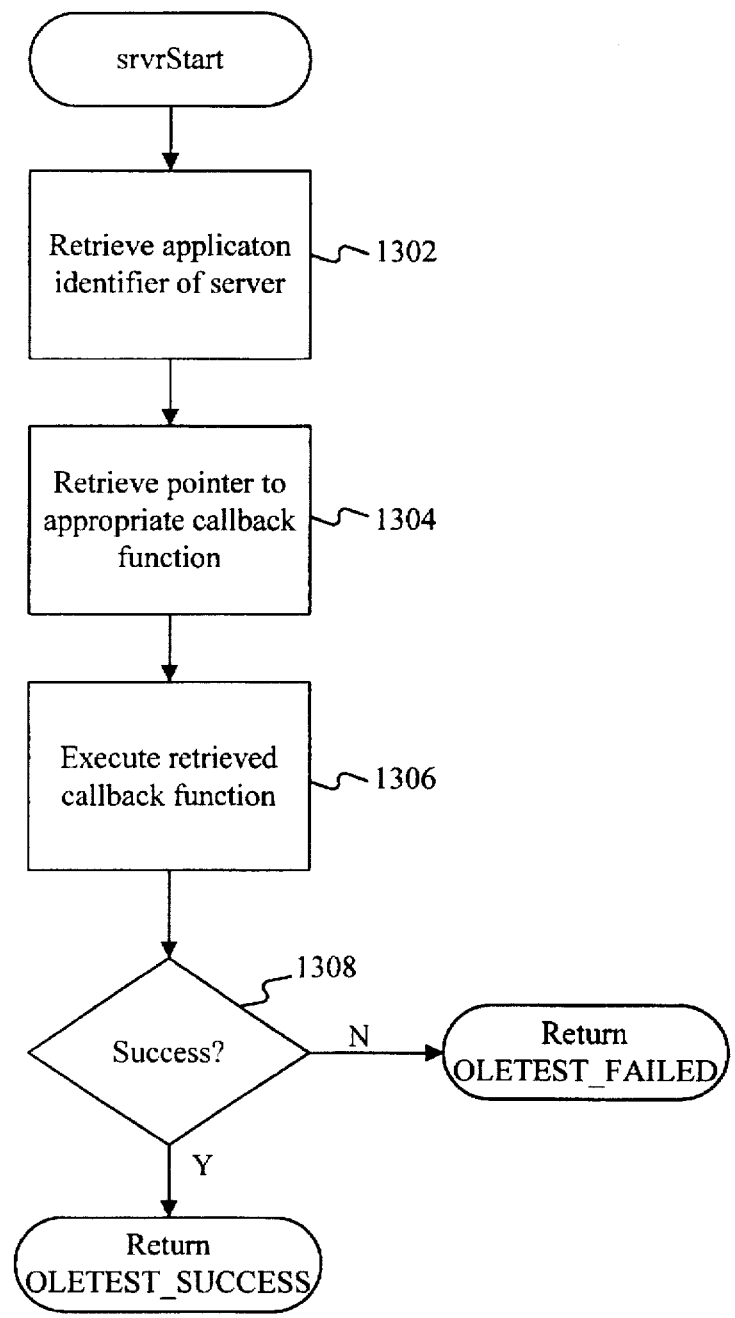
FIG. 13 illustrates an overview flow diagram of the srvrStart function.

FIG. 13 illustrates an overview flow diagram of the srvrStart function. The srvrStart function is called by the test script to start a server application program. In step 1302, the srvrStart function retrieves the application identifier for a server application program that is passed by the invoking test script. In step 1304, the srvrStart function retrieves a pointer to a corresponding application-specific callback function using the application identifier table and callback function table for the application identifier. In step 1306, the srvrStart function executes the retrieved application-specific callback function. In step 1308, if the execution of the application-specific callback function was successful, the srvrStart function returns OLETEST__SUCCESS, else the srvrStart function returns OLETEST__FAILED.

Figure 14:
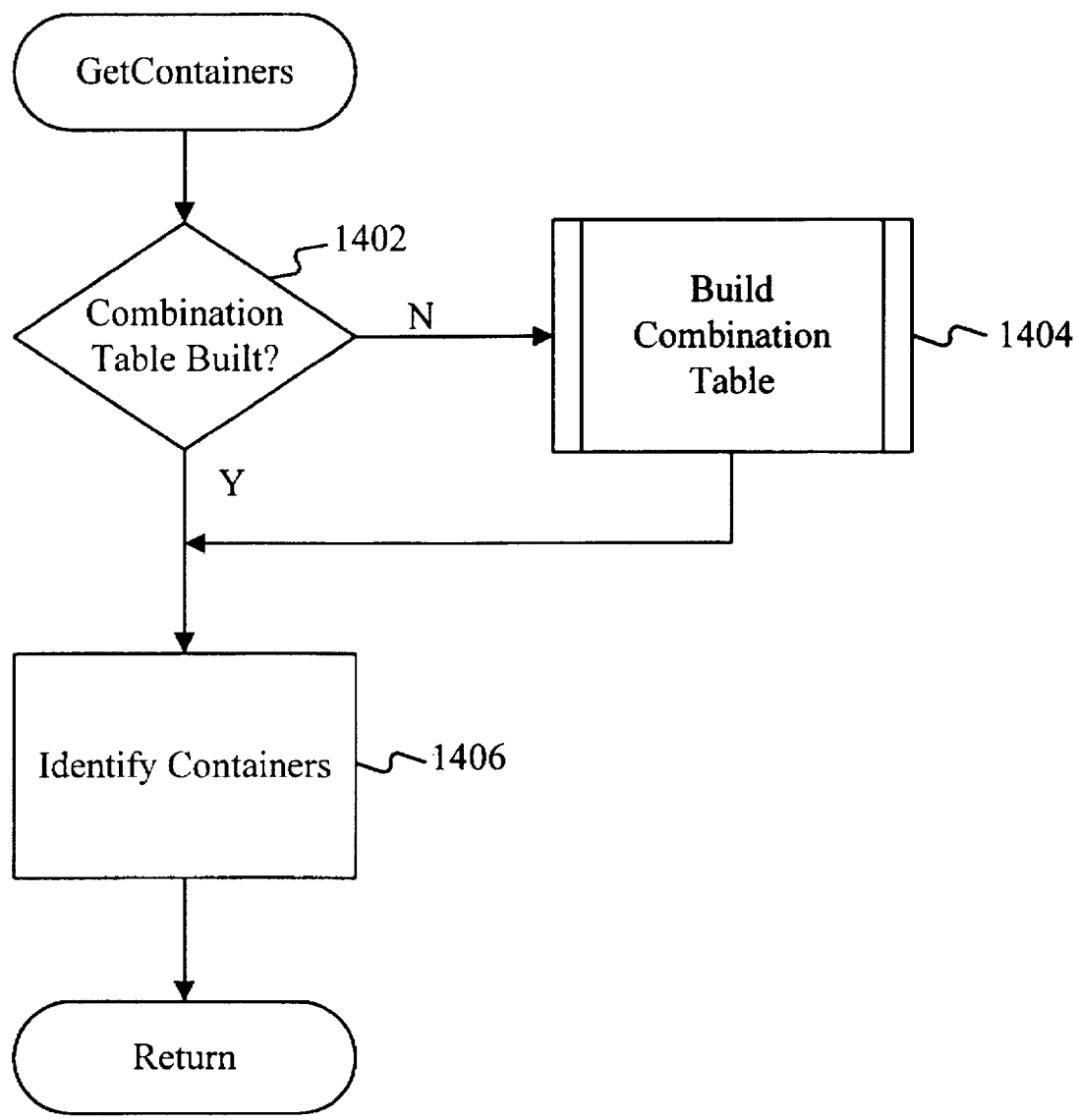
FIG. 14 illustrates an overview flow diagram of the GetContainers function.

FIG. 14 illustrates an overview flow diagram of the GetContainers function. The GetContainers function is called by a test script to retrieve the application identifiers of the configurations of the container application programs upon which the test is to be performed. In step 1402, if a combinations table has already been built, then the GetContainers function continues at step 1406, else the GetContainers function continues at step 1404. In step 1404, the GetContainers function builds a combinations table. In step 1406, the GetContainers function identifies the container application programs, and then returns.

Figure 15:
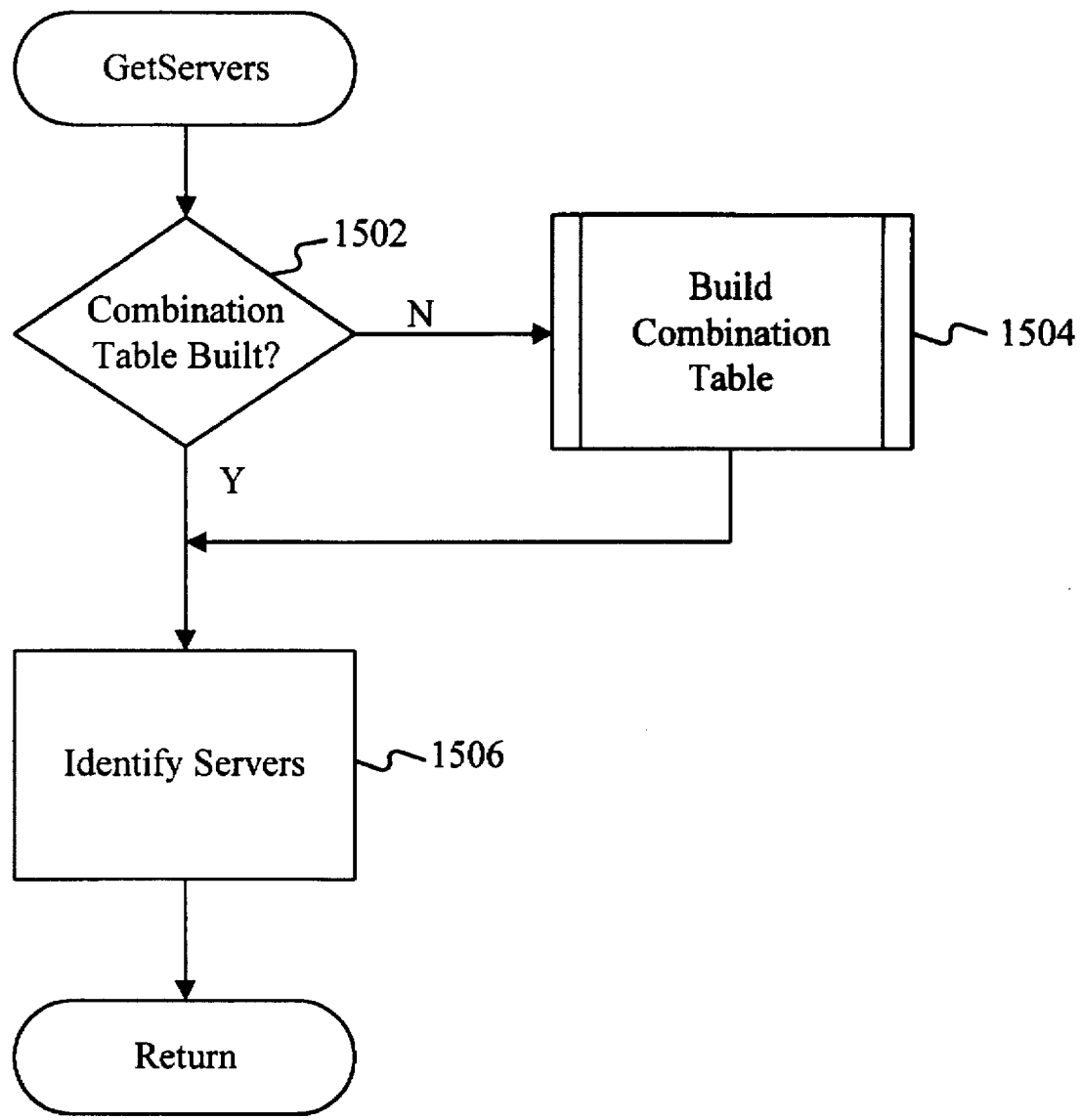
FIG. 15 illustrates an overview flow diagram of the GetServers function.

FIG. 15 illustrates an overview flow diagram of the GetServers function. The GetServers function is called by the test script to retrieve the application identifiers of the configurations of server application programs upon which the test is to be performed. In step 1502, if a combinations table has already been built, the GetServers function continues at step 1506, else the GetServers function continues at step 1504. In step 1504, the GetServers function builds a combinations table. In step 1506, the GetServers function identifies the server application programs, and then returns.

Figure 16:
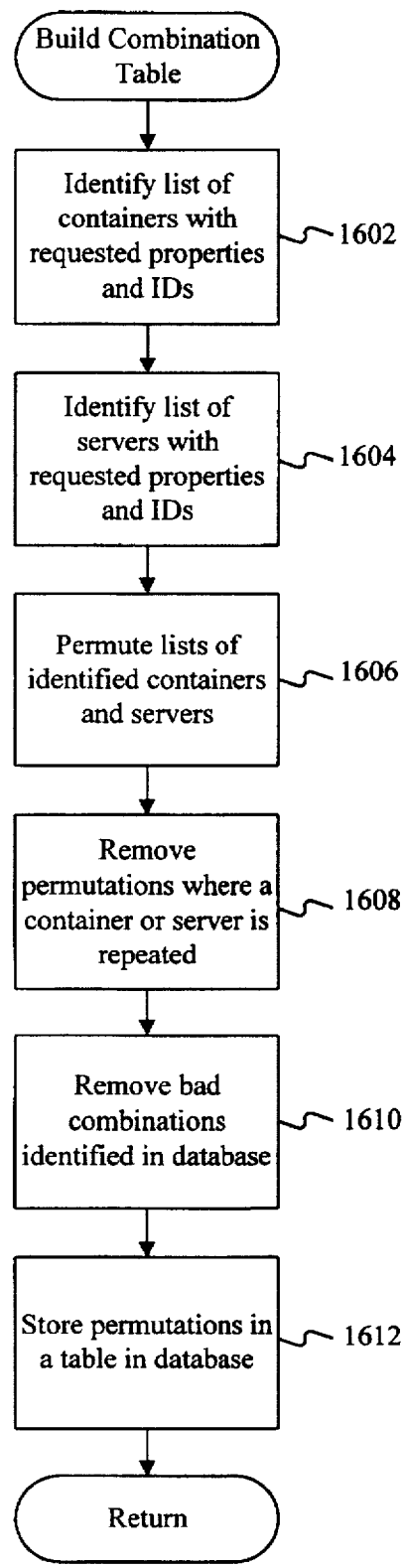
FIG. 16 illustrates an overview flow diagram of the build combinations table routine.

FIG. 16 illustrates an overview flow diagram of the build combinations table routine. The build combinations table routine generates the combinations table based on the container and server application programs identified in the application configuration information table. In step 1602, the build combinations table routine identifies a list of container application programs with the specified properties and application identifiers. In step 1604, the build combinations table routine identifies a list of server application programs with the specified properties and application identifiers. In step 1606, the build combinations table routine permutes the list of identified container application programs and server application programs. In step 1608, the build combinations table routine removes the permutations in which a container application program or server application program is repeated. In step 1610, the build combinations table removes bad combinations identified in the test script information table in the database. In step 1612, the build combinations table stores the permutations in a combinations table in the database and returns.

Figure 17:
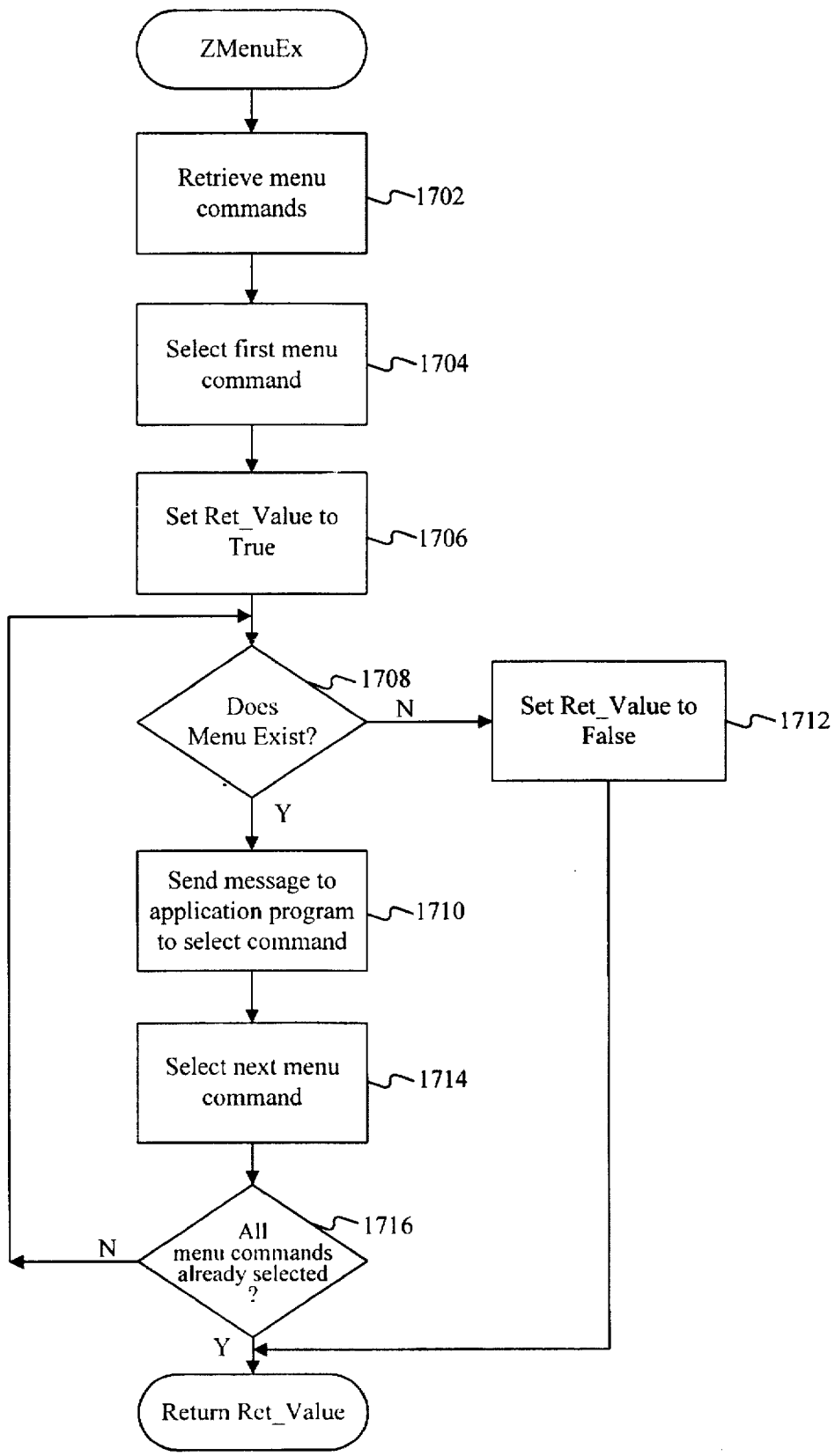
FIG. 17 illustrates an overview flow diagram of a ZMenuEx function.

FIG. 17 illustrates an overview flow diagram of a ZMenuEx function. The ZMenuEx function simulates user activity, such as selecting a menu. In step 1702, the ZMenuEx function retrieves the passed menu commands. In step 1704, the ZMenuEx function selects the first menu command. In step 1706, the ZMenuEx function sets Ret__Value to true. In step 1708, if the menu exists, then the ZMenuEx function continues at step 1710, else the ZMenuEx function continues at step 1712. In step 1710, the ZMenuEx function sends a message to the application program to select a command from the menu. In step 1712, the ZMenuEx function sets the Ret__Value to false. In step 1714, the ZMenuEx function selects the next menu command. In step 1716, if all menu commands have already been selected, the ZMenuEx function returns, else the ZMenuEx function loops back to step 1708.

In an alternate embodiment, an application developer (or a user of the interoperability testing system) may define functions (i.e., user-defined high-level commands) and add these to a DLL. The test script may then call a SingleDispatch API function, which is provided by the interoperability testing system, in order to access a function defined by an application developer.

In this alternate embodiment, the application identifier table has an entry for each configuration of an application program. Each entry of the application identifier table contains an application identifier along with pointers to multiple callback function tables. The interoperability testing system assigns to each callback function table a specified index, so that a callback function table pointer for a given application identifier may be found at the specified index in a list of pointers. The callback function tables may include pointers to implementations of functions defined by an application developer. In addition, a callback function table which has pointers to system-defined high-level commands (i.e., high-level commands provided by the interoperability testing system) may be referred to as a system-defined high-level command table. A callback function table which has pointers to user-defined high-level commands may be referred to as a user-defined high-level command table.

The SingleDispatch function receives an application identifier, a callback function table index, and an offset into the indexed callback function table. When the SingleDispatch function is called, it accesses the indexed callback function table for the configuration of the application program identified by the application identifier. The interoperability testing system accesses a pointer to an implementation of a function in the accessed callback function table based on the offset into the callback function table. The interoperability testing system then executes this function.

Although the present invention has been described in terms of the preferred embodiment, it is not intended that the invention be limited to this embodiment. Modification within the spirit of the intention will be apparent to those skilled in the art. One skilled in the art would appreciate that the methods and systems of the present invention can be used to test a single application program in addition to testing the interoperability of application programs. In addition, although the present invention has been described with API functions in a container DLL, a server DLL, and a support DLL and Zfunctions in a Zfunctions DLL, one DLL may contain the API functions and Zfunctions. The scope of the present invention is defined by the claims which follow.

We claim:

1. A method in a computer system for testing a plurality of application programs, each of the application programs having low-level commands, each of the low-level commands indicating a task to be performed by the application program, the computer system having a test script containing a description of a test to be performed on each of the application programs, the test script having a plurality of application-independent high-level commands, each of the high-level commands specifying a task to be performed by the application program being tested, each of the application programs having an implementation of each of the high-level commands for the application program, each of the implementations having an associated plurality of low-level commands for directing the application program to perform the task of an associated one of the high-level commands, the method comprising the steps of:

selecting each of the high-level commands in the test script;

retrieving the implementation of each of the selected high-level commands for the application program being tested;

selecting each of the low-level commands in each retrieved implementation; and directing the application program being tested to perform the task of each of the selected low-level commands to effect the performance of the task of each of the selected high-level commands.

2. The method of claim 1 including an application information table indicating properties possessed by each of the plurality of application programs, a test script information table indicating which properties each of the application programs to be tested is to possess, and including the step of determining from the application information table and the test script information table which application programs possess the properties of the application programs to be tested.

3. The method of claim 2 wherein each of the low-level commands is a message indicative of an event.

4. The method of claim 3 wherein an event may be a mouse movement or a keyboard command.

5. The method of claim 1 for testing the interoperability of two application programs, wherein each of the high-level commands indicates which of the two application programs is to perform the task of the high-level command; wherein the step of retrieving the implementation retrieves the implementation of the high-level command for the application program that is to perform the task of the high-level command; and wherein the step of directing directs the application program that is to perform the task of the high-level command.

6. The method of claim 5 including an application information table indicating properties possessed by each of the plurality of application programs, a test script information table indicating which properties each of the application programs to be tested is to possess, and including the step of determining from the application information table and the test script information table which application programs possess the properties of the application programs to be tested.

7. The method of claim 6 wherein each of the low-level commands is a message indicative of an event.

8. The method of claim 7 wherein an event may be a mouse movement or a keyboard command.

9. The method of claim 1 including, for each of the plurality of application programs, a high-level command table having an indicator for the implementation of each of the high-level commands for each of the application programs, and a mapping from an identifier of each of the application programs to the high-level command table for that application program, and wherein the step of retrieving the implementation of each of the selected high-level commands includes using the mapping to retrieve the high-level command table for the application program being tested.

10. The method of claim 1 including an application programming interface function for each of the high-level commands, each application programming interface function for receiving an identifier of the application program being tested and for retrieving the implementation of the high-level command corresponding to the identifier of the application program, and including the step of invoking a corresponding application programming interface function for each of the selected high-level commands.

11. The method of claim 10 wherein the application programming interface function returns to the test script, when its execution is successful, a flag indicating successful, and when its execution is not successful, a flag indicating not successful.

12. The method of claim 1 further including the step of receiving an implementation of a user-defined high-level command and wherein the step of retrieving retrieves the received implementation when each of the selected high-level commands is the user-defined high-level command.

13. The method of claim 12 including, for each of the plurality of application programs, a system-defined high-level command table and a user-defined high-level command table, the system-defined high-level command table having an indicator to the implementation of each system-defined high-level command for the application program, the user-defined high-level command table having an indicator to the implementation of each user-defined high-level command for the application program, a mapping from an identifier of the application program to the system-defined high-level command table and to the user-defined high-level command table for the application program, and wherein the step of retrieving the implementation of each of the selected high-level commands includes the steps of retrieving the system-defined high-level command table when the high-level command is a system-defined high-level command; and retrieving the user-defined high-level command table when the high-level command is a user-defined high-level command.

14. The method of claim 1 wherein an application program further includes a configuration of an application program.

15. The method of claim 1 wherein in performing the step of retrieving, different application programs may retrieve the same implementation of each of the selected high-level commands for the application program being tested.

16. A computer testing system for testing a plurality of application programs, each of the application programs having low-level commands, each of the low-level commands indicating a task to be performed by the application program, the computer testing system comprising:
- a test script containing a description of a test to be performed on each of the application programs, the test script having a plurality of application-independent high-level commands, each of the high-level commands specifying a task to be performed by the application program being tested;
- for each of the plurality of application programs,
  for each of the high-level commands,
    an implementation of the high-level command for the application program, the implementation having a plurality of low-level commands for directing the application program to perform the task of the high-level command; and
- a testing component for testing one of the application programs based on the test script, the testing component having
  means for selecting each of the high-level commands in the test script;
  means for retrieving the implementation of each of the selected high-level commands for the application program being tested;
  means for selecting each of the low-level commands in the retrieved implementation; and
  means for directing the application program being tested to perform the task of each of the selected low-level commands to effect the performance of the task of each of the selected high-level commands.

17. The system of claim 16, further comprising:
an application information table indicating properties possessed by each of the plurality of application programs;
a test script information table indicating which properties each of the application programs to be tested is to possess; and
means for determining from the application information table and the test script information table which the application programs possess the properties of the application programs to be tested.

18. The system of claim 17 wherein each of the low-level commands is a message indicative of an event.

19. The system of claim 18 wherein the event may be an event triggered by a mouse or a keyboard.

20. The system of claim 16 for testing the interoperability of two application programs, wherein each of the high-level commands indicates which of the two application programs is to perform the task of the high-level command; and wherein the means for retrieving the implementation retrieves the implementation of the high-level command for the application program that is to perform the task of the high-level command; and wherein the means for directing directs the application program that is to perform the task of the high-level command.

21. The system of claim 20, further comprising:
an application information table indicating properties possessed by each of the plurality of application programs;
a test script information table indicating which properties each of the application programs to be tested is to possess; and
means for determining from the application information table and the test script information table which the application programs possess the properties of the application programs to be tested.

22. The system of claim 21 wherein each of the low-level commands is a message indicative of an event.

23. The system of claim 22 wherein the event may be an event triggered by a mouse or a keyboard.

24. The system of claim 16, further comprising:
for each of the plurality of application programs, a high-level command table having an indicator for the implementation of each of the high-level commands for each of the application programs;
a mapping from an identifier of each of the application programs to the high-level command table for that application program; and
wherein the means for retrieving the implementation of each of the selected high-level commands further comprises means for using the mapping to retrieve the high-level command table for the application program being tested.

25. The system of claim 16, further comprising:
an application programming interface function for each of the high-level commands, each application programming interface function for receiving an identifier of the application program being tested and for retrieving the implementation of the high-level command corresponding to the identifier of the application program, wherein each of the high-level commands is implemented as an invocation of the corresponding application programming interface function.

26. The system of claim 25 wherein the application programming interface function returns to the test script, when its execution is successful, a flag indicating successful, and when its execution is not successful, a flag indicating not successful.

27. The system of claim 16 further including means for receiving an implementation of a user-defined high-level command and wherein the means for retrieving retrieves the received implementation when the selected one of the high-level commands is the user-defined high-level command.

28. The system of claim 27 including, for each of the plurality of application programs, a system-defined high-level command table and a user-defined high-level command table, the system-defined high-level command table having an indicator to the implementation of each system-defined high-level command for the application program, the user-defined high-level command table having an indicator to the implementation of each user-defined high-level command for the application program, a mapping from an identifier of the application program to the system-defined and user-defined high-level command tables for the application program, and wherein the means for retrieving the implementation of each of the selected high-level commands includes means for retrieving the system-defined high-level command table when the high-level command is a system-defined high-level command and means for retrieving the user-defined high-level command table when the high-level command is a user-defined high-level command.

29. The system of claim 16 wherein an application program further comprises a configuration of an application program.

30. The system of claim 16 wherein the means for retrieving may retrieve for different application programs the same implementation of each of the selected high-level commands for the application program being tested.

31. A method in a computer system for testing a plurality of application programs, the computer system having a test script, the test script having a description of a test to be performed on each of the application programs, the test script having application-independent high-level commands, each of the high-level commands having a task, each application program having an application-specific implementation of each of the high-level commands, each application-specific implementation having low-level commands, each of the low-level commands having events for directing the application program to perform a task of the low-level command, the method comprising the steps of:

for each of the application programs
  selecting each high-level command in the test script,
  retrieving the application-specific implementation of each of the selected high-level commands for the application program; and
  for each of the low-level commands in each retrieved application-specific implementation,
    selecting the low-level command; and
    for each event of each of the selected low-level commands, sending the event to the application program to effect the performance of the task of each of the selected high-level commands, whereby each of the application programs is tested using the test script.

32. The method of claim 31 wherein each of the low-level commands is a message indicative of an event.

33. The method of claim 32 wherein the event may be a mouse movement or keyboard command.

34. A computer-readable medium containing instructions for causing a computer system to test a plurality of application programs, the computer system having a test script, the test script having a description of a test to be performed on each of the application programs, the test script having application-independent high-level commands, each of the high-level commands having a task, each application program having an application-specific implementation of each of the high-level commands, each application-specific implementation having low-level commands, each of the low-level commands for directing the application program to perform a task of the low-level command, by:

for each of the application programs,
  selecting each high-level command in the test script,
  retrieving the application-specific implementation of each of the selected high-level commands for the application program; and
  for each of the low-level commands in each retrieved application-specific implementation,
    selecting the low-level command; and
    sending to the application program an indication to effect the performance of the task of each of the selected low-level command.

35. The computer-readable medium of claim 34 wherein each of the low-level commands is a message indicative of an event.

36. The computer-readable medium of claim 35 wherein the event may be a mouse movement or keyboard command.

37. A computer-readable medium containing instructions for causing a computer system to test a plurality of application programs, each of the application programs having low-level commands, each of the low-level commands indicating a task to be performed by the application program, the computer system having a test script containing a description of a test to be performed on each of the application programs, the test script having a plurality of application-independent high-level commands, each of the high-level commands specifying a task to be performed by the application program being tested, each of the application programs having an implementation of each of the high-level commands for the application program, each of the implementations having an associated plurality of low-level commands for directing the application program to perform the task of an associated one of the high-level commands, by:

selecting each of the high-level commands in the test script;

retrieving the implementation of each of the selected high-level commands for the application program being tested;

selecting each of the low-level commands in each retrieved implementation; and directing the application program being tested to perform the task of each of the selected low-level commands to effect the performance of the task of each of the selected high-level commands.

38. The computer-readable medium of claim 37 including an application information table indicating properties possessed by each of the plurality of application programs, a test script information table indicating which properties each of the application programs to be tested is to possess, and including determining from the application information table and the test script information table which application programs possess the properties of the application programs to be tested.

39. The computer-readable medium of claim 38 wherein each of the low-level commands is a message indicative of an event.

40. The computer-readable medium of claim 39 wherein an event may be a mouse movement or a keyboard command.

41. The computer-readable medium of claim 37 for testing the interoperability of two application programs, wherein each of the high-level commands indicates which of the two application programs is to perform the task of the high-level command; wherein the retrieving of the implementation retrieves the implementation of the high-level command for the application program that is to perform the task of the high-level command; and wherein the directing directs the application program that is to perform the task of the high-level command.

42. The computer-readable medium of claim 41 including an application information table indicating properties possessed by each of the plurality of application programs, a test script information table indicating which properties each of the application programs to be tested is to possess, and including determining from the application information table and the test script information table which application programs possess the properties of the application programs to be tested.

* * * * *